United States Patent
Nakao

(10) Patent No.: US 11,601,566 B2
(45) Date of Patent: Mar. 7, 2023

(54) IMAGE READING DEVICE, IMAGE READING PROGRAM, IMAGE PROCESSING DEVICE, AND IMAGE PROCESSING PROGRAM

(71) Applicant: KONICA MINOLTA, INC., Tokyo (JP)

(72) Inventor: Takehisa Nakao, Toyokawa (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/683,822

(22) Filed: Mar. 1, 2022

(65) Prior Publication Data
US 2022/0337721 A1    Oct. 20, 2022

(30) Foreign Application Priority Data
Apr. 9, 2021    (JP) ............................. JP2021-066439

(51) Int. Cl.
*H04N 1/40* (2006.01)
*H04N 1/028* (2006.01)
*H04N 1/00* (2006.01)

(52) U.S. Cl.
CPC ....... *H04N 1/0289* (2013.01); *H04N 1/00811* (2013.01); *H04N 1/00814* (2013.01)

(58) Field of Classification Search
CPC ............. H04N 1/0289; H04N 1/00811; H04N 1/00814
See application file for complete search history.

(56) References Cited

U.S. PATENT DOCUMENTS

| | | | | |
|---|---|---|---|---|
| 2005/0276481 A1* | 12/2005 | Enomoto | ............... | G06V 40/18 382/190 |
| 2008/0131028 A1* | 6/2008 | Pillman | .............. | H04N 9/04555 348/E5.041 |
| 2009/0267982 A1* | 10/2009 | Horii | ..................... | B41J 19/142 347/14 |
| 2010/0008580 A1* | 1/2010 | Mizuno | ............... | H04N 1/3871 382/284 |

FOREIGN PATENT DOCUMENTS

| | | |
|---|---|---|
| JP | 2009171560 A | 7/2009 |
| JP | 2009171561 A | 7/2009 |

OTHER PUBLICATIONS

Toru Tanaka, "Color Reproduction Technology and Sensory / Quantitative Evaluation in Digital Image", Technical Information Journal (Feb. 2005), described in paragraph [0044] of the present application.

* cited by examiner

Primary Examiner — Moustapha Diaby
(74) Attorney, Agent, or Firm — Buchanan Ingersoll & Rooney PC

(57) ABSTRACT

An image reading device includes: an area sensor in which color filters of three colors of R, G, and B are arranged in a Bayer array and a light receiving amount is detected by a light receiving element for each color filter; and a hardware processor that: reads a document by using the light receiving elements in a first group in the area sensor, reads the document by using the light receiving elements in a second group in the area sensor, at a region shifted by ½ pixels in a sub-scanning direction from a reading region of the light receiving elements in the first group, and interpolates R-color read data and B-color read data using G-color read data and synthesizes image data having a resolution twice the resolution of the area sensor.

15 Claims, 20 Drawing Sheets

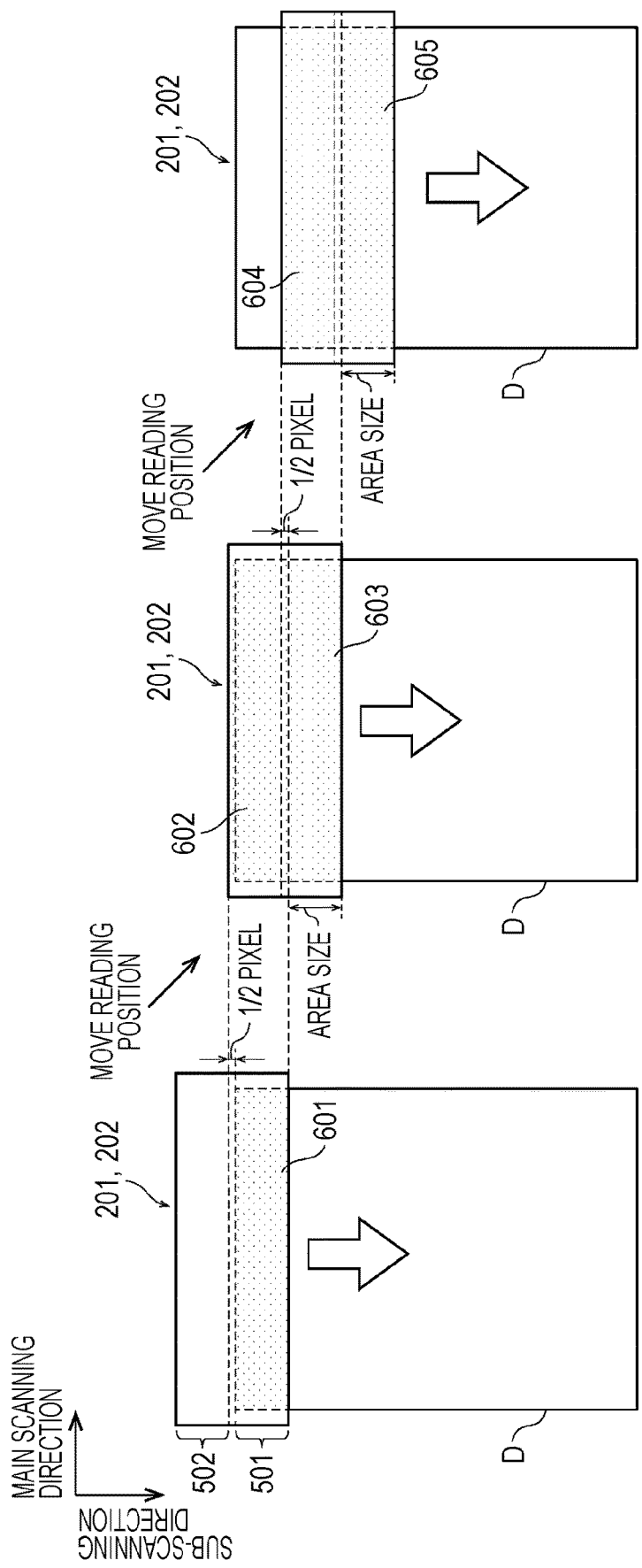

FIG. 8

EXAMPLE OF R-COLOR INTERPOLATED IMAGE DATA (1200dpi × 1200dpi)

| R | Ri | R | Ri | R | Ri | R | Ri | R | Ri | R | Ri |
|---|----|---|----|---|----|---|----|---|----|---|----|
| R | Ri | R | Ri | R | Ri | R | Ri | R | Ri | R | Ri |
| R | Ri | R | Ri | R | Ri | R | Ri | R | Ri | R | Ri |
| R | Ri | R | Ri | R | Ri | R | Ri | R | Ri | R | Ri |

Ri : R-COLOR IMAGE DATA INTERPOLATED BY CALCULATION

EXAMPLE OF B-COLOR INTERPOLATED IMAGE DATA (1200dpi × 1200dpi)

| Bi | B | Bi | B | Bi | B | Bi | B | Bi | B | Bi | B |
|----|---|----|---|----|---|----|---|----|---|----|---|
| Bi | B | Bi | B | Bi | B | Bi | B | Bi | B | Bi | B |
| Bi | B | Bi | B | Bi | B | Bi | B | Bi | B | Bi | B |
| Bi | B | Bi | B | Bi | B | Bi | B | Bi | B | Bi | B |

Bi : B-COLOR IMAGE DATA INTERPOLATED BY CALCULATION

FIG. 9

R-COLOR IMAGE DATA BEFORE INTERPOLATION
(3×3 NEIGHBORHOOD OF PIXEL OF INTEREST)

| R11 | – | R13 |
|-----|---|-----|
| R21 | – | R23 |
| R31 | – | R33 |

G-COLOR IMAGE DATA
(3×3 NEIGHBORHOOD OF PIXEL OF INTEREST)

| G11 | G12 | G13 |
|-----|-----|-----|
| G21 | G22 | G23 |
| G31 | G32 | G33 |

B-COLOR IMAGE DATA BEFORE INTERPOLATION
(3×3 NEIGHBORHOOD OF PIXEL OF INTEREST)

| – | B12 | – |
|---|-----|---|
| – | B22 | – |
| – | B32 | – |

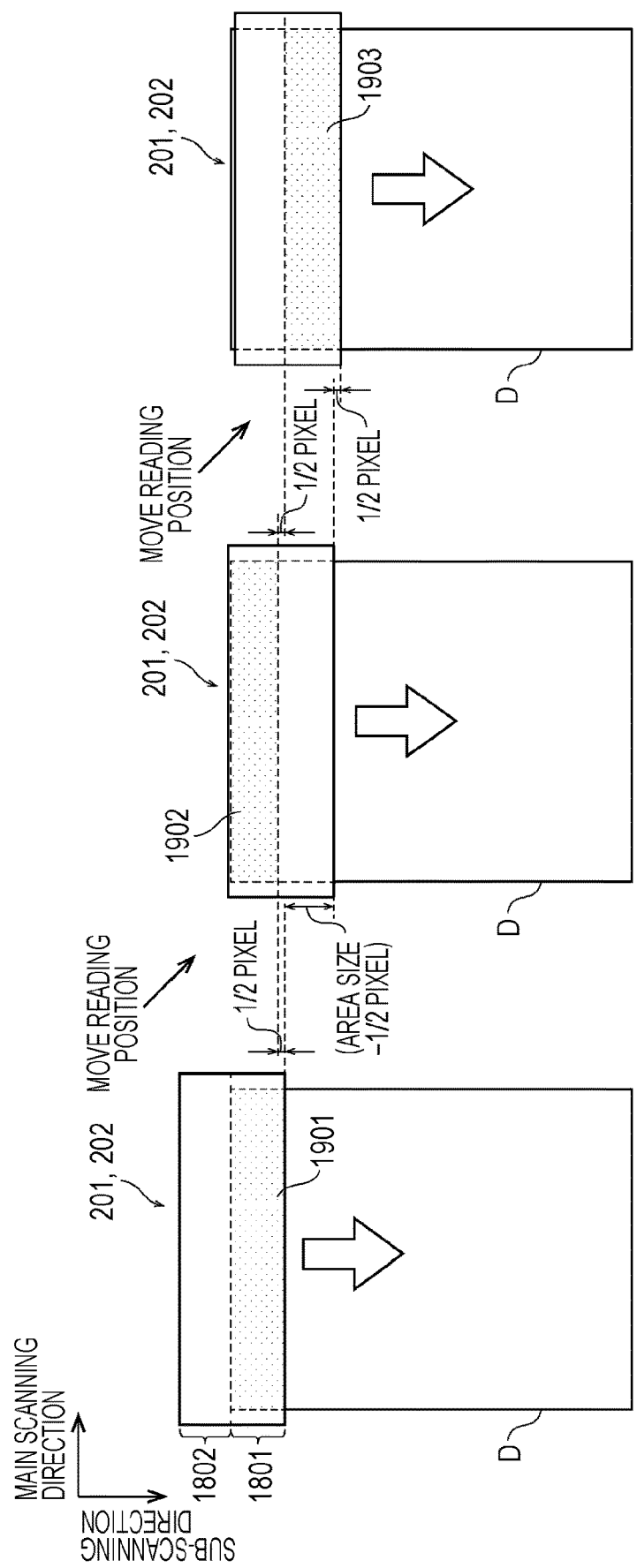

IMAGE READING DEVICE, IMAGE READING PROGRAM, IMAGE PROCESSING DEVICE, AND IMAGE PROCESSING PROGRAM

The entire disclosure of Japanese patent Application No. 2021-066439, filed on Apr. 9, 2021, is incorporated herein by reference in its entirety.

BACKGROUND

Technological Field

The present disclosure relates to an image reading device, an image reading program, an image processing device, and an image processing program.

Description of the Related Art

An image reading device reads a document using a line sensor or an area sensor, and generates image data. An upper limit of the resolution of a reading sensor is generally 600 dots per inch (dpi) in the case of reading an A3 size document. When a halftone printed document is read by the 600 dpi reading sensor, reading performance of a black isolated point in a highlight region and a white isolated point in a shadow region is not stable. Therefore, gradation characteristics are distorted, and a relationship between gradation to be expressed and gradation expressed using halftone dots becomes nonlinear.

Since the black isolated point in the highlight region and the white isolated point in the shadow region have small areas, when the area of the isolated point is smaller than the area of one pixel or when one isolated point extends over a plurality of pixels and the area of the isolated point corresponding to each pixel is smaller than the area of one pixel, the gradation value of the pixel is closer to the background gradation value than the isolated point even when reading is performed with the upper limit resolution of 600 dpi. In this way, when the isolated point is reduced or eliminated, the gradation expressed using halftone dots is distorted.

In order to solve such a problem, for example, a technique for performing image processing such as a smoothing process or an edge enhancement process on image data having distorted gradation characteristics is known. In this manner, the distortion of the gradation characteristics can be made inconspicuous to some extent.

However, since the above-described conventional technique uses image data in which a black isolated point in a highlight region or a white isolated point in a shadow region is not accurately detected, it is difficult to sufficiently improve distortion of gradation characteristics even when image processing such as a smoothing process or an edge enhancement process is performed, and image data of excellent quality cannot be generated.

SUMMARY

The present disclosure has been made in view of the above-described problems, and an object thereof is to provide an image reading device, an image reading program, an image processing device, and an image processing program capable of accurately detecting an isolated point regardless of the level of gradation expressed using halftone dots.

To achieve the abovementioned object, according to an aspect of the present invention, an image reading device reflecting one aspect of the present invention comprises: an area sensor in which color filters of three colors of R, G, and B are arranged in a Bayer array and a light receiving amount is detected by a light receiving element for each color filter; and a hardware processor that: reads a document by using the light receiving elements in a first group in the area sensor, reads the document by using the light receiving elements in a second group in the area sensor, at a region shifted by ½ pixels in a sub-scanning direction from a reading region of the light receiving elements in the first group, and interpolates R-color read data and B-color read data using G-color read data and synthesizes image data having a resolution twice the resolution of the area sensor.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 6A is a diagram illustrating a first reading position on the document D;

FIG. 6B is a diagram illustrating a second reading position on the document D;

FIG. 6C is a diagram illustrating a third reading position on the document D;

FIG. 8 is a plan view illustrating image data after interpolation for R color and B color, respectively;

FIG. 9 is a plan view in which the colors of image data are represented by alphabets and a position is represented by a subscript for each position of each color of R, G, and B on the image data in the 3×3 neighborhood of a pixel of interest;

FIG. 19A is a diagram illustrating a first reading position by the first area on a document D;

FIG. 19B is a diagram illustrating a first reading position by the second area on the document D;

FIG. 19C is a diagram illustrating a second reading position by the first area on the document D;

DETAILED DESCRIPTION OF EMBODIMENTS

Hereinafter, one or more embodiments of the present invention will be described with reference to the drawings. However, the scope of the invention is not limited to the disclosed embodiments.

[1] Configuration of Multifunction Peripheral 1

Figure 1:
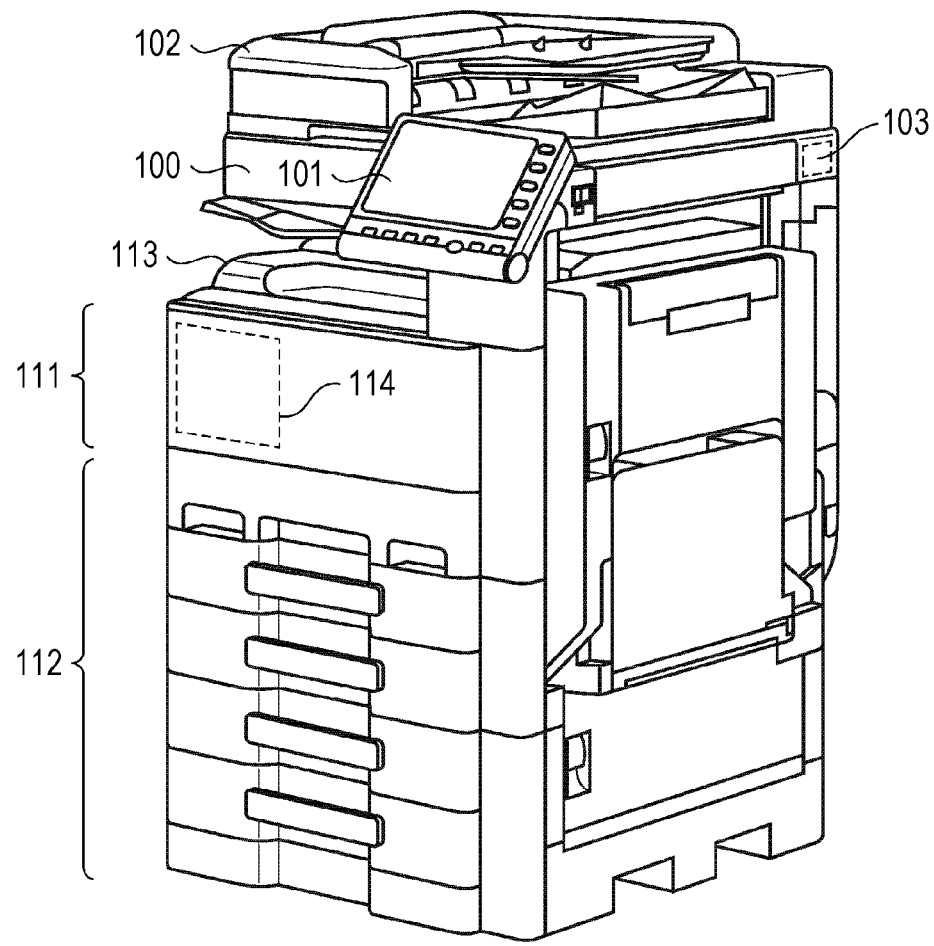
FIG. 1 is an external perspective view illustrating a main configuration of a multifunction peripheral according to an embodiment of the present disclosure.

The multifunction peripheral 1 according to the present embodiment has a plurality of functions such as an image reading function, a copying function, a facsimile function, a network function, and a BOX function, and includes an image reading unit 100, an operation panel 101, an automatic document feeder (ADF) 102, an image forming unit 111, and a sheet feeding unit 112 as illustrated in FIG. 1.

The operation panel 101 includes a touch panel, a hard key, a speaker, a light emitting diode (LED), and the like. The operation panel 101 presents information to the user of the multifunction peripheral 1 on a touch panel screen or the like. The user can operate a touch panel, a hard key, or the like and the operation panel 101 accepts the instruction input. The instruction input by the user is, for example, an input for instructing reading of a document.

The image reading unit 100 optically reads a document by a sheet-through method or a platen set method and generates image data. In a case where the document is read by the sheet-through method, the automatic document feeder 102 causes the image reading unit 100 to read the document while conveying the document sheet by sheet from the document bundle. In the case of the platen set method, the image reading unit 100 reads a document placed on a platen glass. The image reading unit 100 includes an image reading control unit 103. The image reading control unit 103 monitors and controls the operation of the image reading unit 100, and executes a process such as image processing in order to generate image data.

The image forming unit 111 forms an image on a recording sheet using image data generated by the image reading unit 100 or image data designated by a user. The sheet feeding unit 112 includes a plurality of sheet feeding trays, and can store different types of recording sheets for each sheet feeding tray. The sheet feeding unit 112 supplies the recording sheet designated by the user to the image forming unit 111. When an image is formed, the image forming unit 111 ejects the recording sheet onto a sheet ejection tray 113.

The multifunction peripheral 1 includes a main body control unit 114. The main body control unit 114 is a so-called computer to monitor and control the operation of the multifunction peripheral 1. In particular, the main body control unit 114 generates image data by controlling the operation of the image reading unit 100, generating image data with high resolution, and performing image processing on the image data.

[2] Configuration of Image Reading Unit 100

Figure 2:
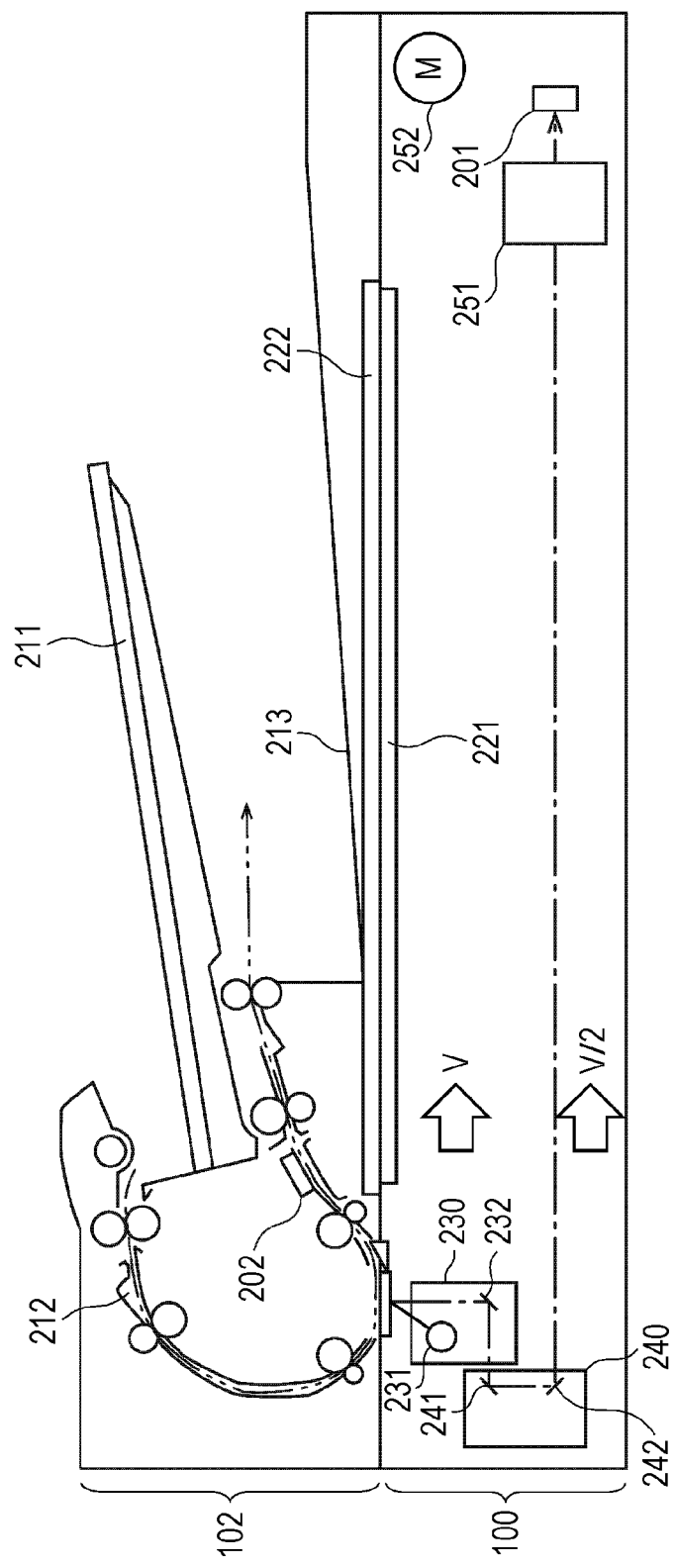
FIG. 2 is a cross-sectional perspective view illustrating main configurations of an image reading unit and an automatic document feeder for reading a document D by a sheet-through method and a platen set method.

In the case of reading a document by the sheet-through method, as illustrated in FIG. 2, the automatic document feeder 102 feeds the document one sheet at a time from the top of the document bundle placed on a document tray 211, and makes the image reading unit 100 read the document while conveying the document along a document conveying path 212. The image reading unit 100 reads the surface of the document using an area sensor 201. In a case where the back surface of the document is also read, the image reading unit 100 uses an area sensor 202.

The area sensors 201 and 202 are both color image sensors. According to the present embodiment, a case where the area sensor 202 constitutes a contact image sensor (CIS) will be described as an example, but the present disclosure is obviously not limited to the contact image sensor. The read document is sequentially ejected onto a sheet ejection tray 213.

When a document is read by the platen set method, the document D is placed on a platen glass 221. The automatic document feeder 102 also serves as a document cover, and presses the document D against the platen glass 221 using a white plate 222. The image reading unit 100 includes a first mirror unit 230 and a second mirror unit 240. By being driven by a document scanner motor 252, the first mirror unit 230 can move from a home position along the reading surface of the document D in the sub-scanning direction at a speed V.

Similarly, by being driven by the document scanner motor 252, the second mirror unit 240 can move from a home position along the reading surface in the sub-scanning direction at a speed V/2. The first mirror unit 230 and the second mirror unit 240 start to move from the home positions when reading the document D.

The first mirror unit 230 includes a document illumination lamp 231 and a first mirror 232. The document illumination lamp 231 illuminates a reading region on the reading surface of the document D. The first mirror 232 reflects the reflected light from the reading region and guides the reflected light to the second mirror unit 240. The second mirror unit 240 includes a second mirror 241 and a third mirror 242. The second mirror 241 reflects the reflected light guided by the first mirror 232 and guides the reflected light to the third mirror 242. The third mirror 242 reflects light from the second mirror 241 and guides the light to a lens 251.

The lens 251 focuses the light from the third mirror 242 and causes the light to be incident on the area sensor 201. The image reading unit 100 causes reflected light from the reading region to be incident on the area sensor 201 while moving the first mirror unit 230 and the second mirror unit 240, thereby reading the document D by the platen set method.

When the document D is read by the sheet-through method, the first mirror unit 230 is moved such that the first mirror 231 of the first mirror unit 230 is located immediately below the reading position of the document D. The second mirror unit 240 is moved to a position accordingly.

Figure 3:
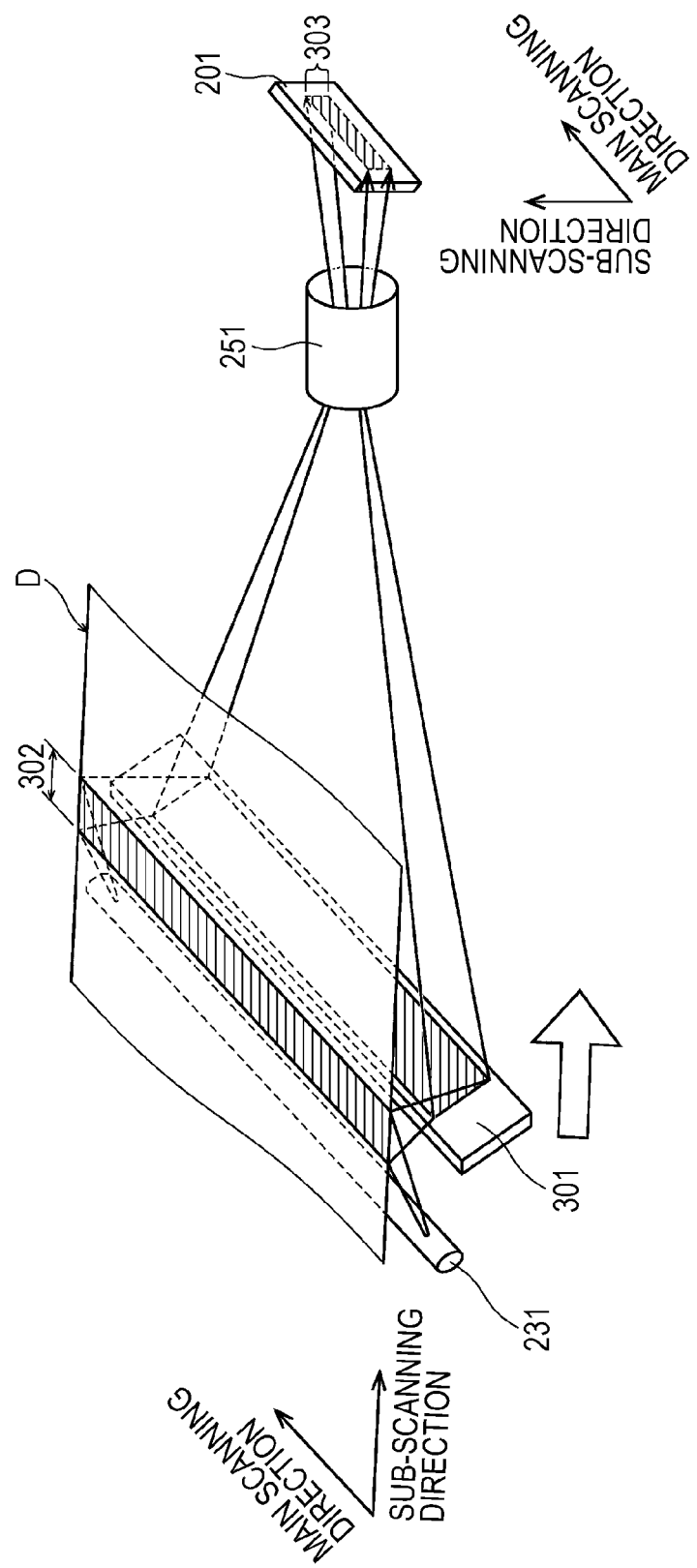
FIG. 3 is a perspective view schematically illustrating an optical path until reflected light from a reading region on a document D enters a light receiving region of an area sensor when the document D is read by the platen set method.

As illustrated in FIG. 3, when a reflection optical system 301 including the first mirror unit 230 and the second mirror unit 240 moves in the sub-scanning direction, a reading region 302 on the reading surface of the document D also moves in the sub-scanning direction. The reflected light from the reading region 302 enters a predetermined region 303 of the area sensor 201 via the lens 251 regardless of the positions of the reflection optical system 301 and the reading region 302 in the sub-scanning direction. As described later, the predetermined region 303 is divided into a first area and a second area.

[3] Area Sensors 201 and 202

The area sensors 201 and 202 have substantially the same configuration. Therefore, in the following description, the area sensors 201 and 202 will be collectively referred to simply as "area sensor" without reference numerals.

Figure 4:
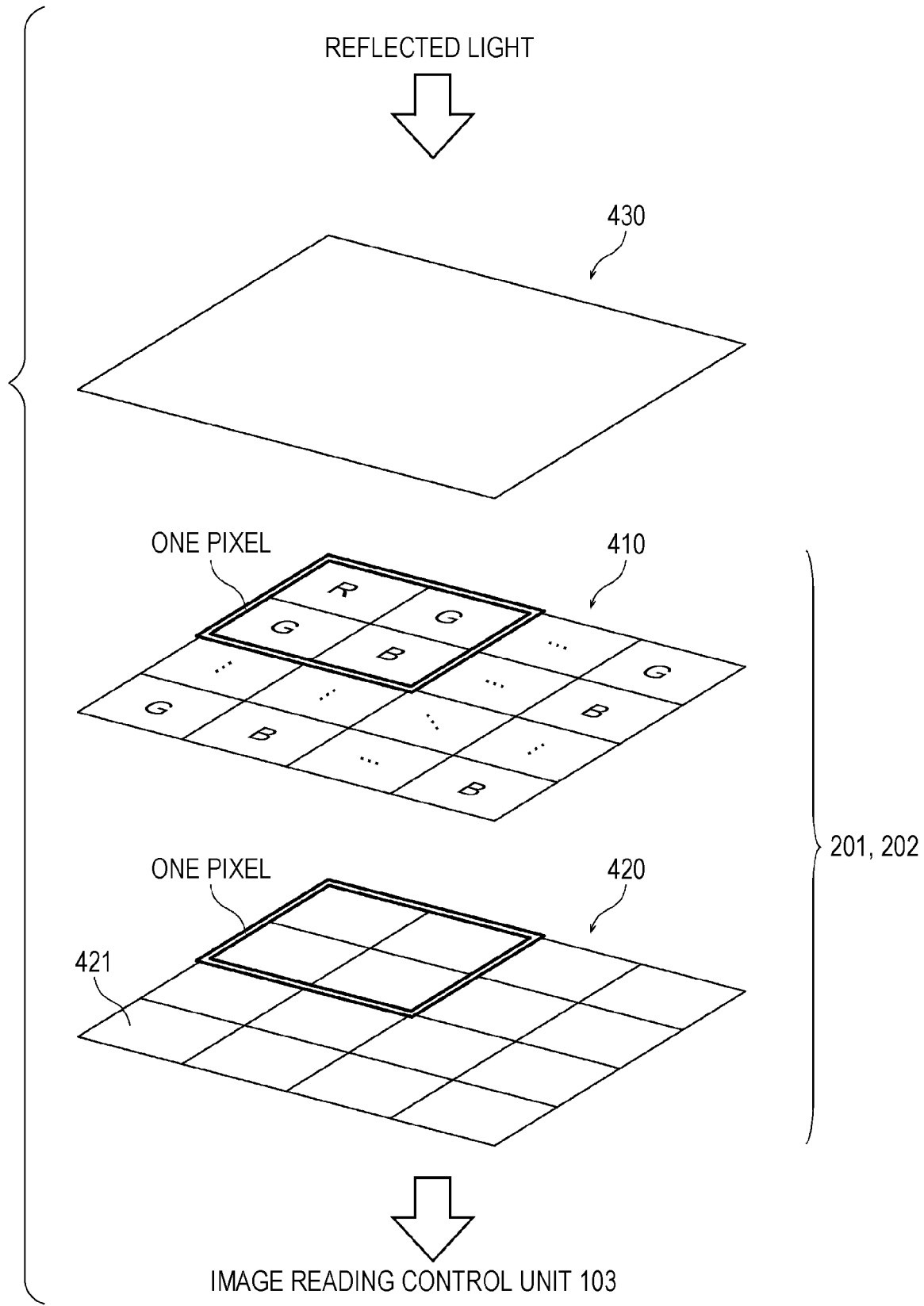
FIG. 4 is an exploded perspective view illustrating a main configuration of the area sensor.

The area sensor is a color image sensor that reads a color image. As illustrated in FIG. 4, the area sensor includes a color filter unit 410 and a sensor unit 420. The reflected light from the document D enters the sensor unit 420 via the color filter unit 410.

A shutter device 430 such as a liquid crystal shutter is disposed on an optical path of incident light from the document D to the color filter unit 410, and is opened and closed in accordance with a reading timing of the area sensor (a movement state of a reading position). When the shutter device 430 is opened at each reading timing, reflected light from the document D enters the sensor unit 420, and the amount of incident light is detected in each light receiving element 421 of the sensor unit 420.

In the sensor unit 420, the light receiving elements 421 are two-dimensionally arranged in a lattice shape. According to the present embodiment, the light receiving elements 421 are arranged such that the resolution is 1200 dpi in both the main scanning direction and the sub-scanning direction. The light receiving amount of the incident light detected by each light receiving element 421 is read by the image reading control unit 103.

The color filter unit 410 band-restricts the light color of the incident light entering each light receiving element 421 of the sensor unit 420 to any one of red (R), green (G), and blue (B). The color filter units 410 are arranged according to a so-called Bayer arrangement. In other words, a square array of two G-color filters, one R-color filter, and one B-color filter as one set is defined as one pixel, and the G-color filters are arranged at diagonal positions in the square array.

The arrangement of the color filters of the respective colors in the square array is not limited as long as the two color filters of the G color are arranged at diagonal positions. Therefore, the arrangement of the color filters of the respective colors in the square array for each pixel includes the arrangement exemplified in FIG. 4 and the arrangement in which the positions of the R color and the B color are switched. Furthermore, two types of arrangements in which the diagonal positions of the G color are different from those in the example of FIG. 4 and the positions of the R color and the B color are different are also conceivable.

Therefore, a total of four kinds of square arrays can be taken. In addition, the arrangement of the color filters of the respective colors in the square array is the same for all the pixels of the color filter unit 410.

The color filters of the respective colors of R, G, and B correspond to the respective light receiving elements 421 on a one-to-one basis. For this reason, the resolution is 1200 dpi in a color filter unit of each color of R, G, and B, and the resolution is 600 dpi in a pixel unit in which four color filters are arranged in a square array. Therefore, the R-color filter and the B-color filter are shifted by ½ pixels in both the main scanning direction and the sub-scanning direction.

Figure 5A:
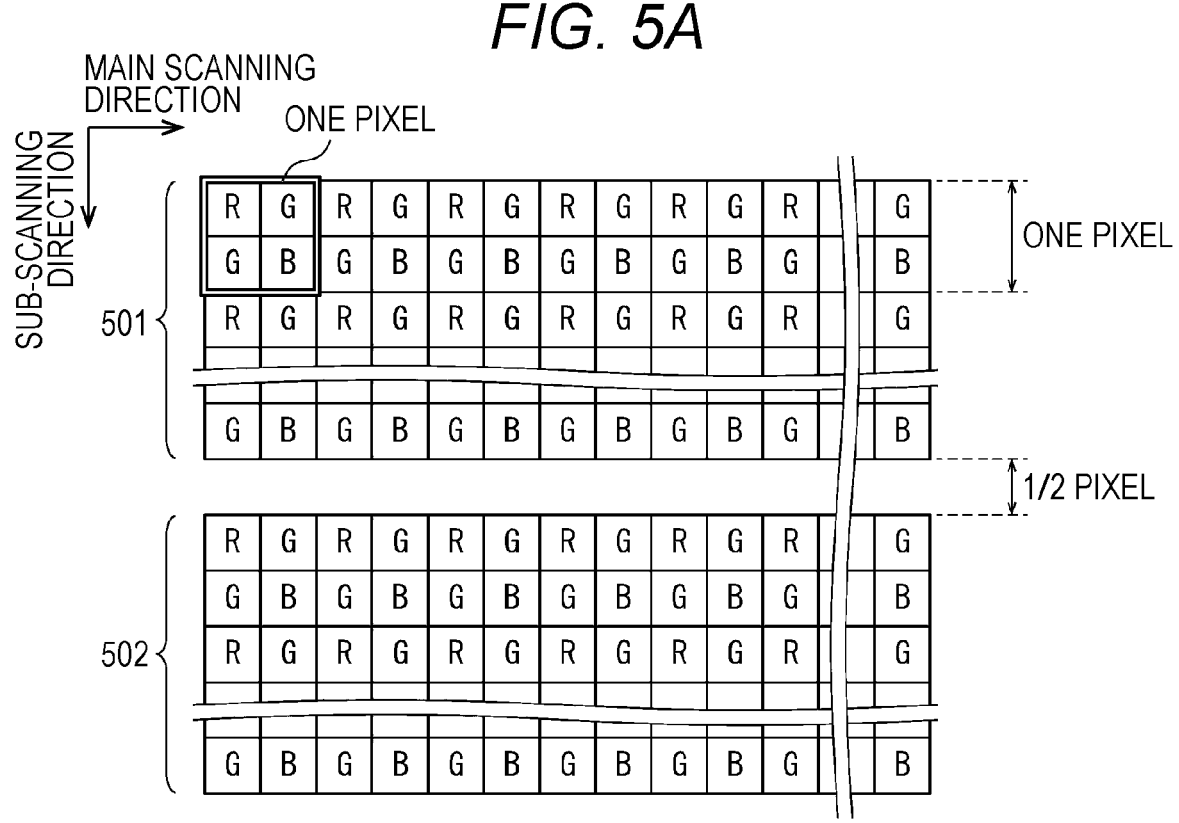
FIG. 5A is a plan view illustrating a color filter configuration of a first area and a second area of the area sensor.

As illustrated in FIG. 5A, the area sensor has a first area 501 and a second area 502 in plan view from the direction in which the reflected light from the document D enters. The first area 501 and the second area 502 have the same number of pixels in the main scanning direction, and also have the same number of pixels in the sub-scanning direction.

As described above, the first area 501 and the second area 502 also coincide with each other in the arrangement of the color filters of the respective colors of R, G, and B in each pixel. The first area 501 and the second area 502 are at the same position in the main scanning direction, and are arranged so as to be separated by ½ pixels in the sub-scanning direction.

The area sensor reads the entire document D in the first area 501 and also reads the entire document D in the second area 502. As illustrated in FIGS. 6A to 6C, in the first area 501, the document D is read in the order of a region 601, a region 603, and a region 605 in the sub-scanning direction. The regions 601, 603, and 605 are in contact with each other in the sub-scanning direction.

In the second area 502, the document D is sequentially read in regions 602 and 604 in the sub-scanning direction. The regions 602 and 604 are also in contact with each other in the sub-scanning direction. Since the first area 501 and the second area 502 are separated by ½ pixels in the sub-scanning direction, the regions 601 and 602 are shifted by ½ pixels in the sub-scanning direction, and similarly, the regions 603 and 604 are also shifted by ½ pixels in the sub-scanning direction.

The size of the regions 601 to 605 in the sub-scanning direction coincides with the sizes of the first area 501 and the second area 502 in the sub-scanning direction. Furthermore, in FIG. 6A, a case where one end in the sub-scanning direction of the region 601 coincides with the edge side of the document D has been described as an example, but the present disclosure is obviously not limited to this example, and one end in the sub-scanning direction of the region 601 may not coincide with the edge side of the document D.

Figure 5B:
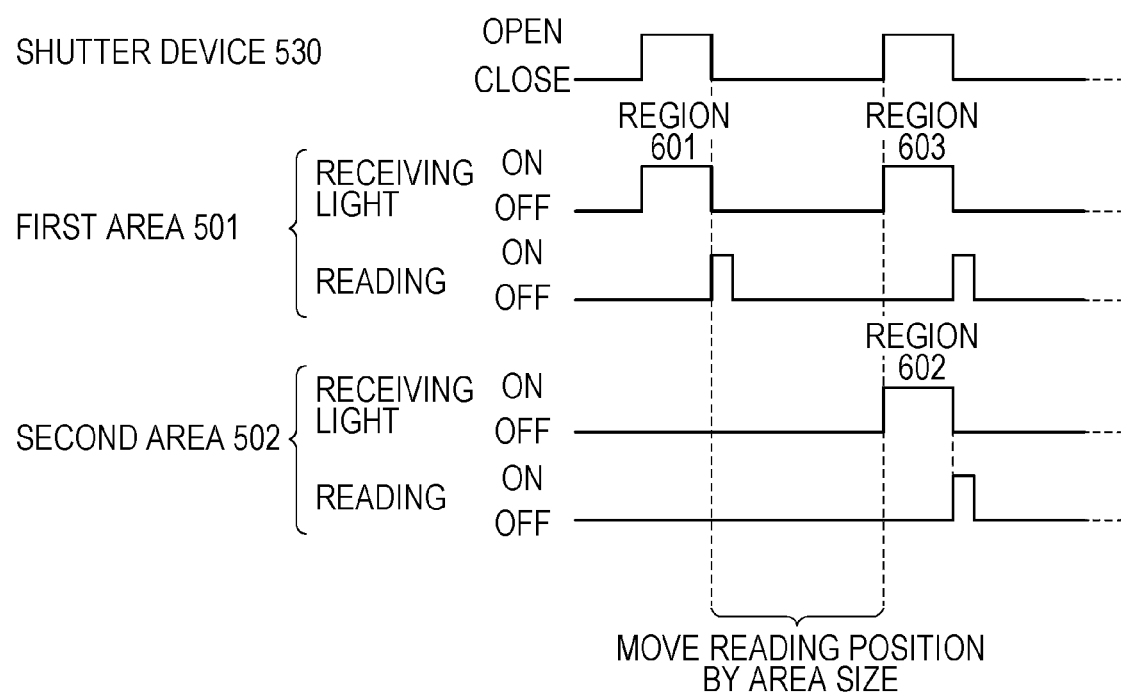
FIG. 5B is a timing chart for explaining reading timings of the first area and the second area.

At the time of reading the document D, as illustrated in FIG. 5B, the first area 501 first receives the reflected light from the region 601 when the shutter device 430 is "opened", and the light receiving amount is read when the shutter device 430 is subsequently "closed".

When the shutter device 430 is "opened" for the second time, the reading region of the document D by the first area 501 becomes the region 603. The first area 501 receives the reflected light from the region 603 when the shutter device 430 is "opened", and the light receiving amount is read when the shutter device 430 is subsequently "closed".

When the shutter device 430 is "opened" for the second time, the second area 502 receives the reflected light from the region 602 shifted from the region 601 by ½ pixel, and the light receiving amount is read when the shutter device 430 is subsequently "closed".

Similarly, when the shutter device 430 is "opened" for the third time, the reading region of the document D by the first area 501 is the region 605, and the first area 501 receives the reflected light from the region 605 when the shutter device 430 is "opened". Furthermore, the second area 502 receives reflected light from the region 604 shifted from the region 603 by ½ pixels. Then, when the shutter device 430 is subsequently "closed", the light receiving amount is read from both the first area 501 and the second area 502.

In this manner, each of the first area 501 and the second area 502 reads the entire document D.

[4] Synthesis of Image Data

Next, using the read data of the first area 501 and the read data of the second area 502, color image data of 1200 dpi is synthesized.

Figure 7A:
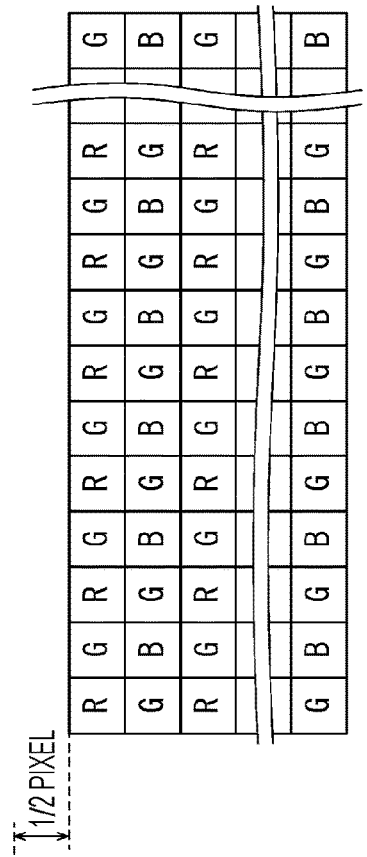
FIG. 7A illustrates the reading positions and reading colors of the first area.
Figure 7B:
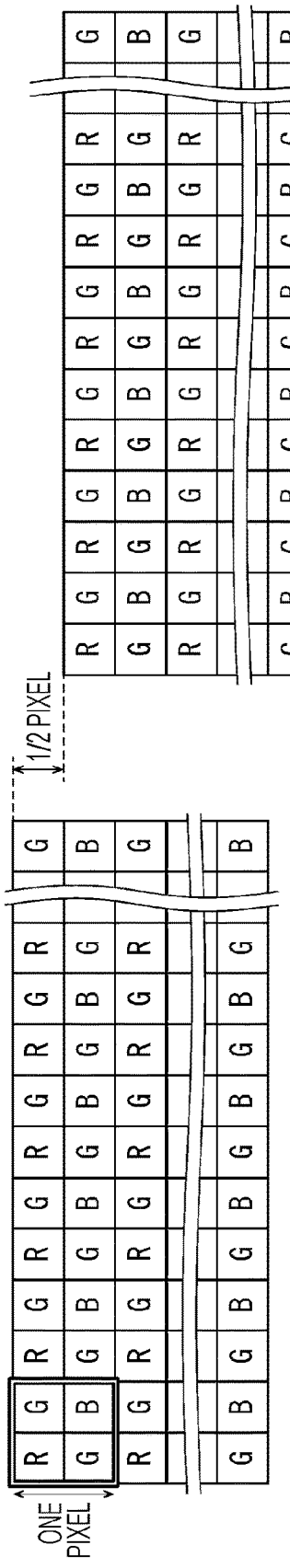
FIG. 7B illustrates the reading positions and reading colors of the second area in relation to FIG. 7A.

FIG. 7A illustrates reading positions and reading colors of the first area 501, and FIG. 7B illustrates reading positions and reading colors of the second area 502. Since the reading position of the first area 501 and the reading position of the second area 502 are shifted by ½ pixels, the second area 502 reads G color at the position on the document D where the first area 501 reads R color or B color.

Figure 7C:
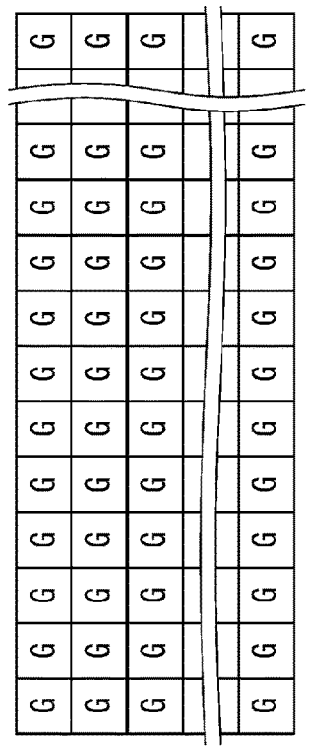
FIG. 7C illustrates synthesized image data for each reading color.

Therefore, when G color is extracted and synthesized from the read data of the first area 501 and the read data of the second area 502, G-color image data having a resolution of 1200 dpi in both the main scanning direction and the sub-scanning direction can be synthesized as illustrated in FIG. 7C.

For the position where G color is read in the first area 501, R color or B color is read in the second area 502. The first area 501 and the second area 502 have the same position at which R color is read in the main scanning direction. Therefore, when R color is extracted and synthesized from the read data of the first area 501 and the read data of the second area 502, R-color image data having 600 dpi in the main scanning direction and 1200 dpi in the sub-scanning direction can be synthesized as illustrated in FIG. 7C.

Similarly, since the first area 501 and the second area 502 coincide with each other at the position where B color is read, similarly to R color, by synthesizing the B-color read data in the first area 501 and the second area 502, it is possible to synthesize the R-color image data having 600 dpi in the main scanning direction and 1200 dpi in the sub-scanning direction as illustrated in FIG. 7C.

Next, the image data is interpolated by calculation so that the R-color image data and the B-color image data also have 1200 dpi in the main scanning direction. FIG. 8 illustrates interpolation image data of R color and B color. In the R-color interpolation image data, the image data Ri at the position where there is no image data in FIG. 7C is interpolated by calculation. Similarly, in the B-color interpolation image data, the image data Bi at the position where there is no image data in FIG. 7C is interpolated by calculation.

When image data is interpolated, a nearest-neighbor method, a bilinear method, or a bicubic method can be used. In the present embodiment, an interpolation method based on gradients described in Toru TANAKA, "Color Reproduction Technology and Sensory/Quantitative Evaluation in Digital Image", Technical Information Journal (February 2005), is used. However, for G-color image data, since actual measurement values are obtained for all the pixels, it is not necessary to perform interpolation. In addition, in a case where the pixel values of the R color and the B color are interpolated, actual measurement values of G color can be used. In this sense, high-resolution image data can be obtained with higher accuracy compared to a case where interpolating process is simply performed using the image data in the Bayer array.

For example, in the case of interpolating R-color image data, the image data R22 is calculated as in following Equation 1 using R21, R23, G21, and G23 adjacent to the pixel of interest in the main scanning direction among the image data in the 3×3 neighborhood of the pixel of interest to which the R-color image data is to be interpolated as illustrated in FIG. 9.

[Equation 1]
$$R22 = \frac{(R21 - G21) + (R23 - G23)}{2} + G22 \quad (1)$$

Note that the B-color image data is not used as expressed in Equation 1. Similarly to the R-color image data, since the resolution of the B-color image data in the main scanning direction is low (600 dpi), it is conceivable that the R-color image data can be interpolated with high accuracy by using only the G-color image data having a high resolution (1200 dpi) in the main scanning direction.

When above Equation 1 is transformed,

[Equation 2]
$$R22 = \frac{R21 + R23}{2} + \frac{(G22 - G21) + (G22 - G23)}{2} \quad (2)$$

Accordingly, when the difference (gradation difference) between the G-color image data of the pixel of interest and the peripheral pixels is small, interpolation is mainly performed using the peripheral R-color image data, and when the gradation difference of the G color is large, interpolation is performed using the image data of G color in addition to R color.

In this case, an absolute value Dr of the gradation difference of the R color is calculated as in following Equation 3.

[Equation 3]
$$Dr = \left| \frac{R21 + R23}{2} \right| \quad (3)$$

An absolute value Dg of the gradation difference of G color is calculated as in the following Equation 4.

[Equation 4]
$$Dg = \left| \frac{(G22 - G21) + (G22 - G23)}{2} \right| \quad (4)$$

In a case where the absolute value Dg of the gradation difference of G color is smaller than the threshold value calculated using the absolute value Dr of the gradation difference of R color, for example, as in the following Equation 5,

[Equation 5]

$$Dg < k \times Dr \quad (5)$$

the value obtained by multiplying the absolute value Dr of the gradation difference of R color by the constant k (for example, 1/10) is compared with the absolute value Dg of the gradation difference of G color, and when the absolute value Dg is smaller, the R-color image data of the pixel of interest may be interpolated only with the first term on the right side including only the R-color image data, ignoring the second term on the right side of above Equation 2. Conversely, in a case where the absolute value Dg is the multiplication value k×Dr or more, interpolation is performed using above Equation 1 as it is.

The same applies to the case of interpolating the B-color image data of the pixel of interest.

[5] Configuration of Image Reading Control Unit 103

The image reading control unit 103 synthesizes the image data as described above.

Figure 10:
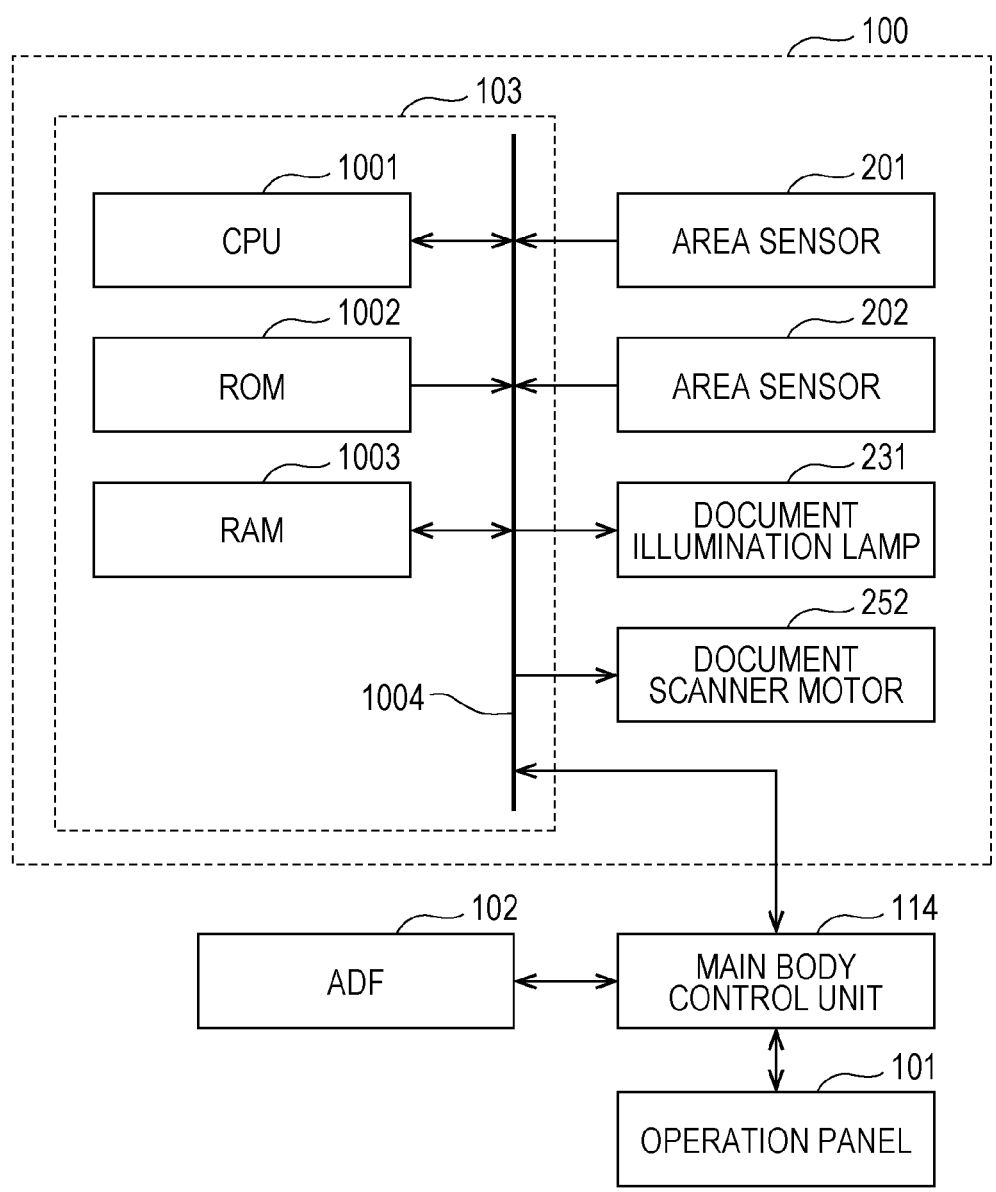
FIG. 10 is a block diagram illustrating an accommodated configuration of an image reading control unit.

As illustrated in FIG. 10, the image reading control unit 103 includes a central processing unit (CPU) 1001, a read only memory (ROM) 1002, and a random access memory (RAM) 1003 which are communicably connected to each other via an internal bus 1004.

When the multifunction peripheral 1 is powered on and the image reading unit 100 is energized to reset the CPU 1001, the CPU 1001 reads and activates a boot program from the ROM 1002, and further executes a control program, an image processing program, and the like read from the ROM 1002 using the RAM 1003 as a working storage area.

As a result, the image reading control unit 103 turns on and off the document illumination lamp 231 and rotationally drives the document scanner motor 252. In addition, the image reading control unit 103 reads image data from the area sensor and resets the area sensor.

The image reading control unit 103 is connected to a main body control unit 114, receives a command according to an instruction input by the user using the operation panel 101, and operates in cooperation with the automatic document feeder 102.

Furthermore, the image reading control unit 103 performs the above-described image data synthesis process or performs image processing on image data.

[6] Operation of Image Reading Control Unit 103

The operation of the image reading control unit 103 will be described focusing on a case of synthesizing high-resolution image data and performing image processing.

Figure 11:
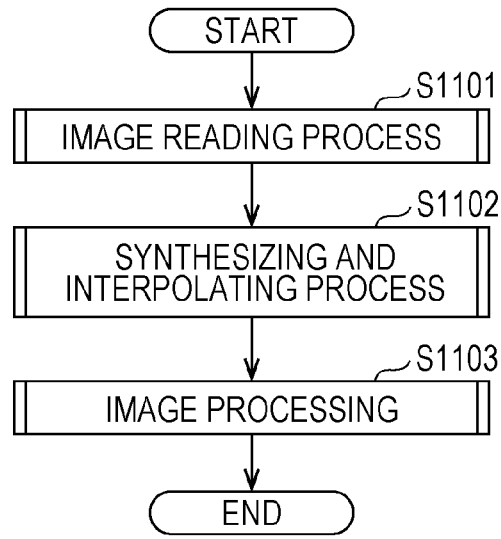
FIG. 11 is a flowchart for explaining the operation of the image reading control unit in the case of generating high-resolution image data and performing image processing.

As illustrated in FIG. 11, the image reading control unit 103 first executes an image reading process (S1101), and executes a synthesizing and interpolating process (S1102) of synthesizing high-resolution image data from the read image data and enhancing the resolution by interpolation. Thereafter, image processing is executed using the high-resolution image data (S1103).

(6-1) Image Reading Process (S1101)

Figure 12:
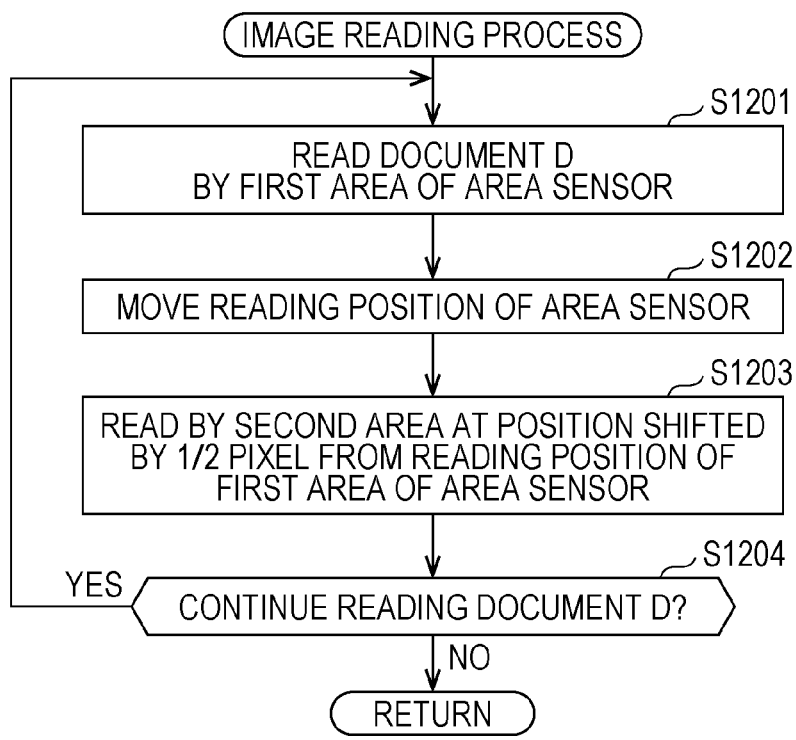
FIG. 12 is a flowchart illustrating image reading process executed by the image reading control unit.

In the image reading process, as illustrated in FIG. 12, first, the document D is read in the first area 501 of the area sensor (S1201). Next, the reading position of the area sensor is moved (S1202). After this movement, the reading position shifted by ½ pixels in the sub-scanning direction from the reading position of the first area 501 in step S1201 is read by the second area 502 of the area sensor (S1203).

Thereafter, in a case where the reading of the document D is continued (S1204: YES), the process proceeds to step S1201 and the above-described process is repeated. When the reading of the document D is completed (S1204: NO), the process returns to the upper routine.

(6-2) Synthesizing and Interpolating Process (S1102)

Figure 13:
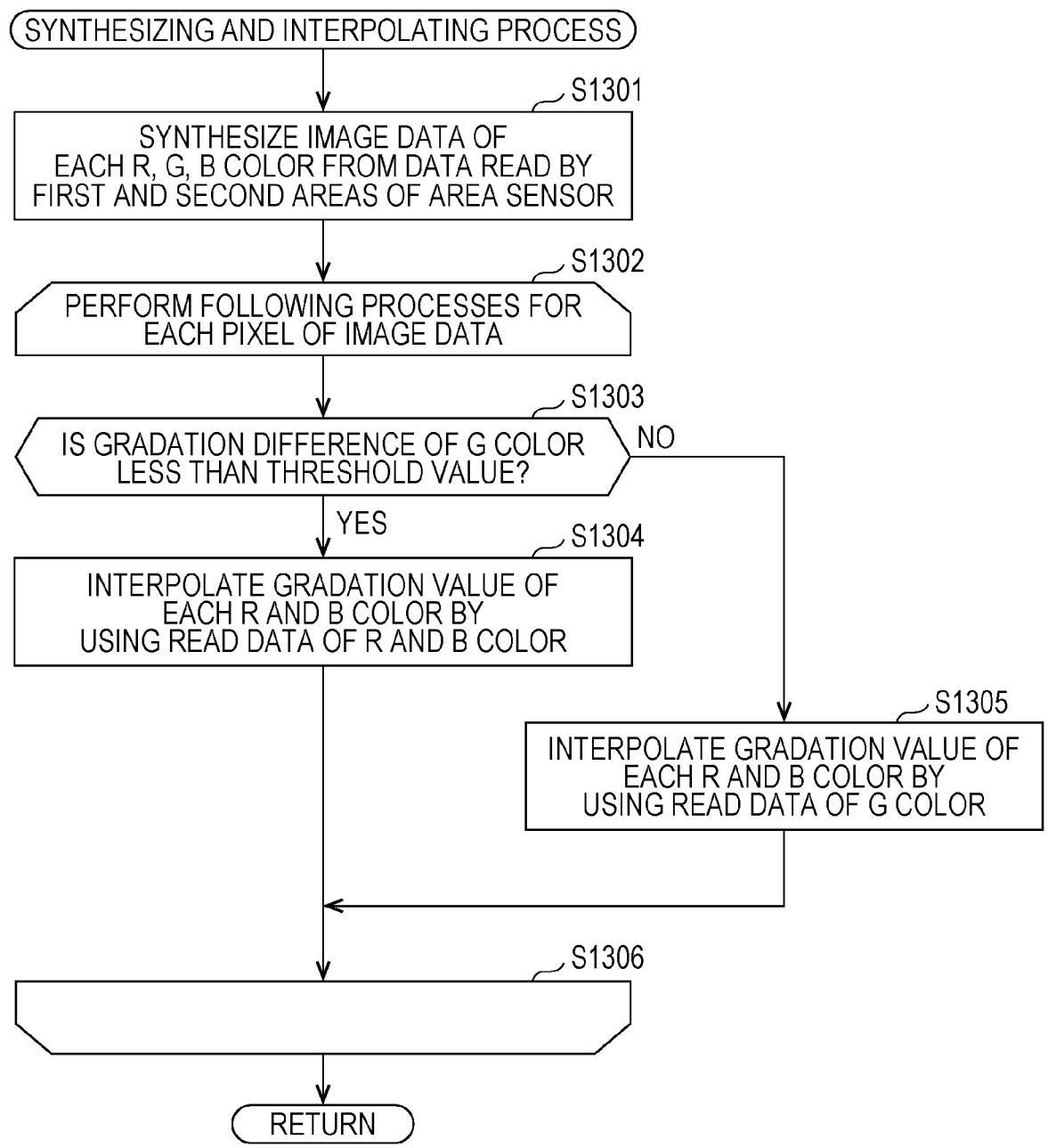
FIG. 13 is a flowchart illustrating image data synthesizing and interpolating process executed by the image reading control unit.

As illustrated in FIG. 13, the image data read in the first area 501 and the image data read in the second area 502 are synthesized for the respective R, G, B colors (S1301). In the image data read in the first area 501 and the image data read in the second area 502, the color filters in both the first area 501 and the second area 502 are in the Bayer array, and the images are shifted from each other by ½. Therefore, image data of the same color can be synthesized on a common pixel in an image of 1200 dpi×1200 dpi without overlapping (see FIG. 7C).

Next, the processes from step S1302 to step S1306 are executed for each pixel of image data of 1200 dpi×1200 dpi. In other words, as described in above Equations (3) to (5) regarding the pixel of interest, when the gradation difference of the G-color image data between the pixel of interest and the peripheral pixels of the pixel of interest is smaller than the threshold value (S1303: YES), as in the first term of above Equation (2), when the R-color image data is interpolated, the gradation value of the color is interpolated using only the R-color image data of the peripheral pixels of the pixel of interest, and when the B-color image data is interpolated, the gradation value of the color is interpolated using only the B-color image data of the peripheral pixels of the pixel of interest (S1304).

On the other hand, in a case where the gradation difference of the G-color image data between the pixel of interest and the peripheral pixels of the pixel of interest is equal to or larger than the threshold value (S1303: NO), the gradation value of G color is interpolated using not only the image data of the color of the peripheral pixels of the pixel of interest but also G-color image data as in above Equation (2) (S1305).

In this manner, since color image data having a high resolution of 1200 dpi can be obtained also for R color and B color, halftone dots having a small area such as black halftone dots in the highlight region and white halftone dots in the shadow region can be accurately read. By using such high-resolution color image data, an image with excellent quality can be obtained by performing image processing without distorting gradation characteristics.

(6-3) Image Processing (S1103)

Figure 14:
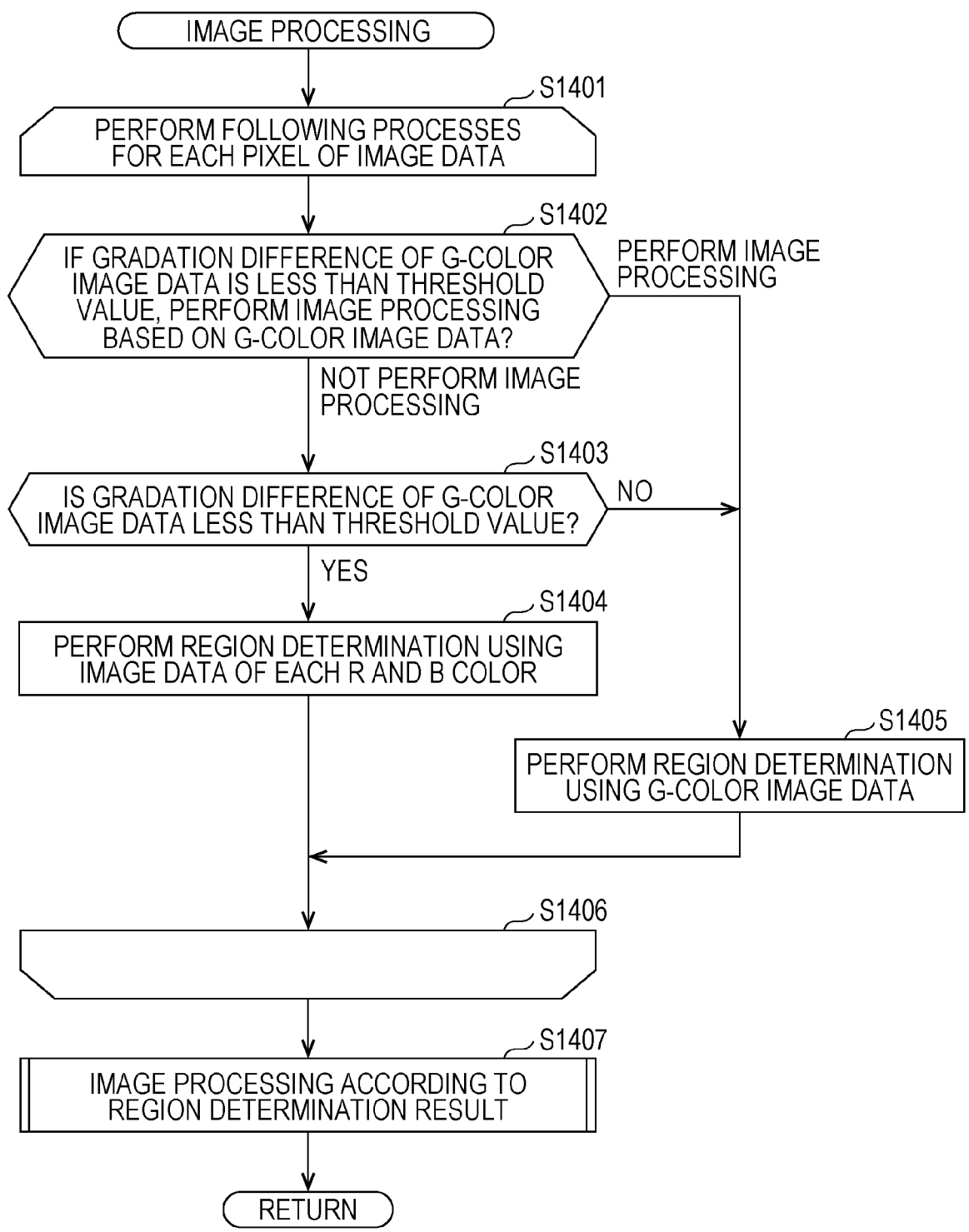
FIG. 14 is a flowchart illustrating image processing executed by the image reading control unit.

As illustrated in FIG. 14, in the image processing, first, a region determination process is executed as in steps S1401 to S1406 for each pixel. In other words, it is confirmed whether "when the gradation difference of G color is less than the threshold value, the image processing based on the G-color image data is not performed." is set with reference to the user setting related to the image processing.

Since it can be said that the G-color image data is more accurate than the complemented image data of R and B colors in the sense that the G-color image data is data actually measured for all pixels, the image processing can be accurately executed based on the G-color image data. On the other hand, when the gradation difference between the G-color image data is small and the gradation difference in the R-color image data and the B-color image data is large, it is preferable to execute image processing using the R-color image data and the B-color image data.

The above user setting is used to indicate which of these is to be prioritized. For example, the user can perform the setting according to the type of original document. For example, in a case where a monochrome image of R color or B color is included, if the user sets the image processing to be executed using the image data of R color or B color, image processing suitable for the characteristics of the image is executed, so that high image quality can be obtained.

This user setting may be accepted, for example, by allowing the user to operate the operation panel 101. When an image reading job is received from another apparatus via a communication network such as a local area network (LAN), the image reading job may be designated. In either case, the main body control unit 114 receives the job once, and then the user instruction is transmitted to the image reading control unit 103.

In a case where the user setting has been made (S1402: not performed), it is confirmed whether or not the gradation difference of the G-color image data in the peripheral pixels of the pixel of interest (which may be the region of interest including the pixel of interest) is less than the threshold value. When the gradation difference is less than the threshold value (S1403: YES), the region determination is executed using the image data of each color of R and B (S1404).

On the other hand, when the user setting has not been made (S1402: Yes) and when the gradation difference of the G-color image data is greater than or equal to the threshold value (S1403: No) although the user setting is made (S1402: No), the region determination is executed using the image data of each G color (S1406).

In the present embodiment, whether the pixel of interest belongs to the photograph region or the text region is determined, and when the pixel of interest belongs to the text region, whether the pixel of interest belongs to the halftone region, whether the pixel of interest belongs to the edge region, and whether the pixel of interest belongs to the thin line region are further determined. Note that the types of regions to be determined may be more or less than the above, and it is sufficient that an appropriate type of region is determined according to image processing to be performed later.

Figure 15:
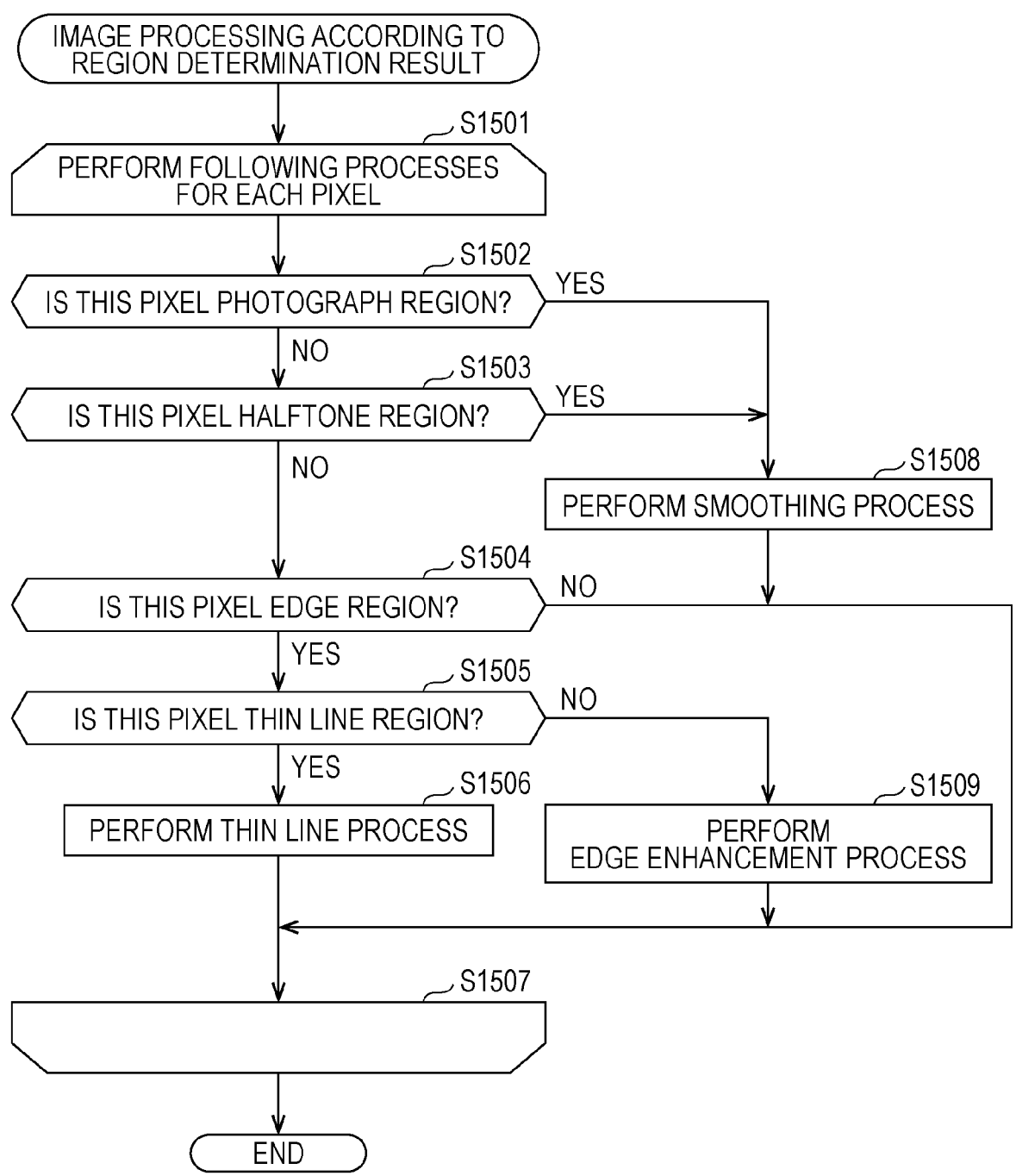
FIG. 15 is a flowchart illustrating image processing according to a region determination result executed by the image reading control unit.

When the region determination process is completed for all the pixels, image processing according to the result of the region determination is executed (S1407). In the image processing according to the region determination result, as illustrated in FIG. 15, the processes from step S1501 to step S1507 are executed for each pixel. When the pixel of interest belongs to the photograph region (S1502: YES), a smoothing process is executed (S1508).

Further, it is confirmed whether the pixel of interest belongs to the text region (S1502: NO) and whether the pixel of interest belongs to the halftone region. When the pixel of interest belongs to the halftone region (S1503: YES), a smoothing process is executed (S1508). When the pixel of interest does not belong to the halftone region (S1503: NO) and belongs to the edge region (S1504: YES), it is confirmed whether the pixel of interest belongs to the thin line region.

When the pixel of interest belongs to the thin line region (S1505: YES), a thin line process is executed (S1506). When the pixel of interest belongs to the edge region (S1504: YES) but does not belong to the thin line region (S1505: NO), an edge enhancement process is executed (S1509). After completion of the processes of steps S1506, S1508, and S1509, and in a case where the pixel of interest does not belong to the edge region (S1504: NO), the image processing according to the region determination result is completed, and the process returns to the image processing (S1103) which is the upper routine.

In the image processing (S1103), when the process returns from the image processing (S1407) according to the region determination result, the process returns to the main routine.

As a technique of obtaining image data with a resolution higher than the resolution of the area sensor, for example, a technique of reading image data for a plurality of frames having a deviation of less than one pixel from a document image by obliquely arranging the area sensor, and synthesizing image data with a resolution higher than the resolution at the time of reading by performing interpolating process using image data with corrected inclination has been proposed (see, for example, JP 2009-171560 A and JP 2009-171561 A).

However, in the above-described conventional technique, since the area sensor is arranged in an inclined manner, even in a case where image data having a resolution equal to or lower than the resolution of the area sensor is generated, it is necessary to correct the inclination of the image data or perform interpolating process, and the processing load may be unnecessarily high.

On the other hand, according to the present embodiment, since it is not necessary to obliquely arrange the area sensor, image data with high resolution can be obtained without correcting the inclination of the image data. Therefore, it is possible to avoid an unnecessary increase in the processing load required for increasing the resolution of the image data.

[7] Modification Examples

Although the present disclosure has been described based on the embodiment, the present disclosure is clearly not limited to the above-described embodiment, and the following modification examples can be implemented.

(7-1) In the above embodiment, the case where the first area 501 and the second area 502 are separated by ½ pixels on the area sensor has been described as an example. However, the present disclosure is obviously not limited to this example, and the following may be performed instead.

Figure 16A:
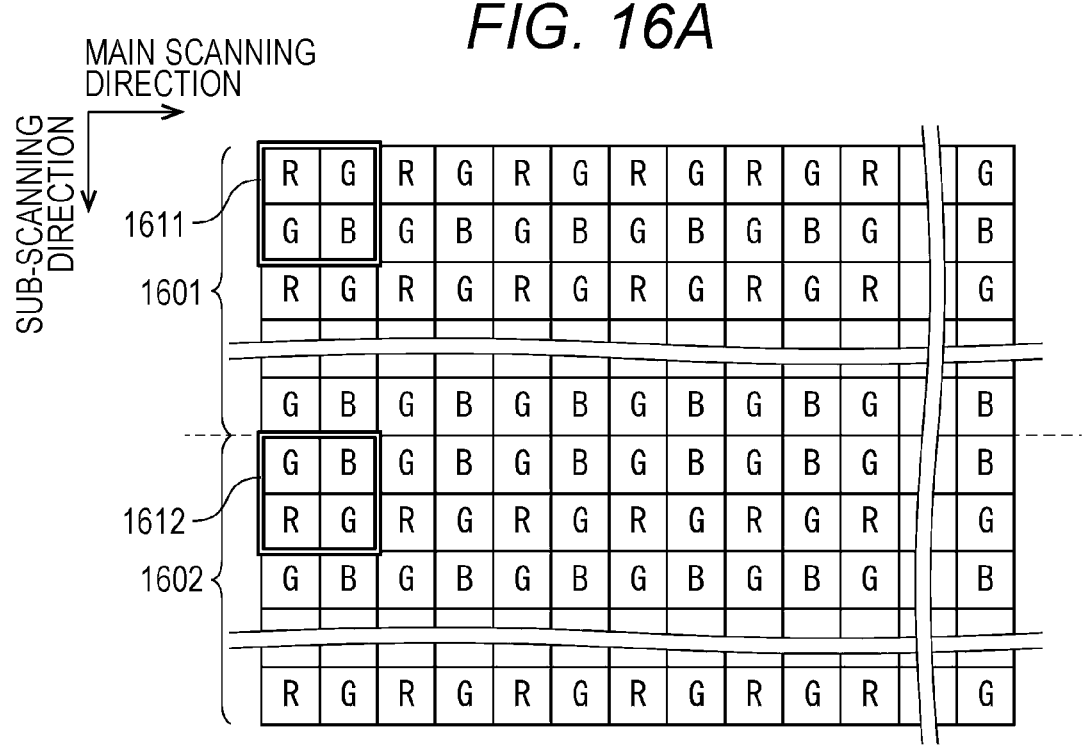
FIG. 16A is a plan view for explaining a filter configuration of a first area and a second area according to a modification example of the present disclosure.

For example, as illustrated in FIG. 16A, the pattern of the color filters arranged in the Bayer array may be shifted by ½ pixels without separating a first area 1601 and a second area 1602. For example, in a pixel 1611 at the upper left of the first area 1601, the color filter is R color at the upper left and B color at the lower right.

On the other hand, in an upper left pixel 1612 of the second area 1602 corresponding to the upper left pixel 1611 of the first area 1601, the color filter is R color at the lower left and B color at the upper right. As described above, the color filter pattern is shifted by ½ pixels between the first area 1601 and the second area 1602.

Figure 16B:
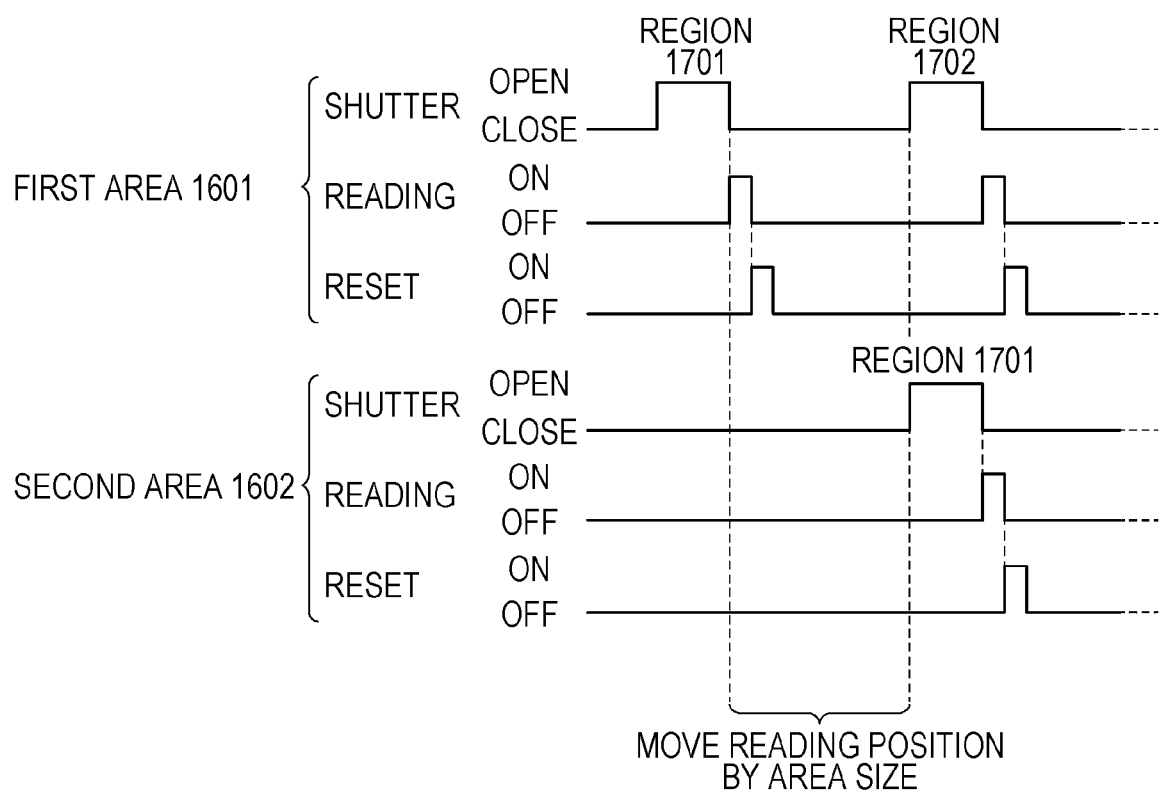
FIG. 16B is a timing chart for explaining reading timings in the first area and the second area.
Figures 17A, 17B, 17C:
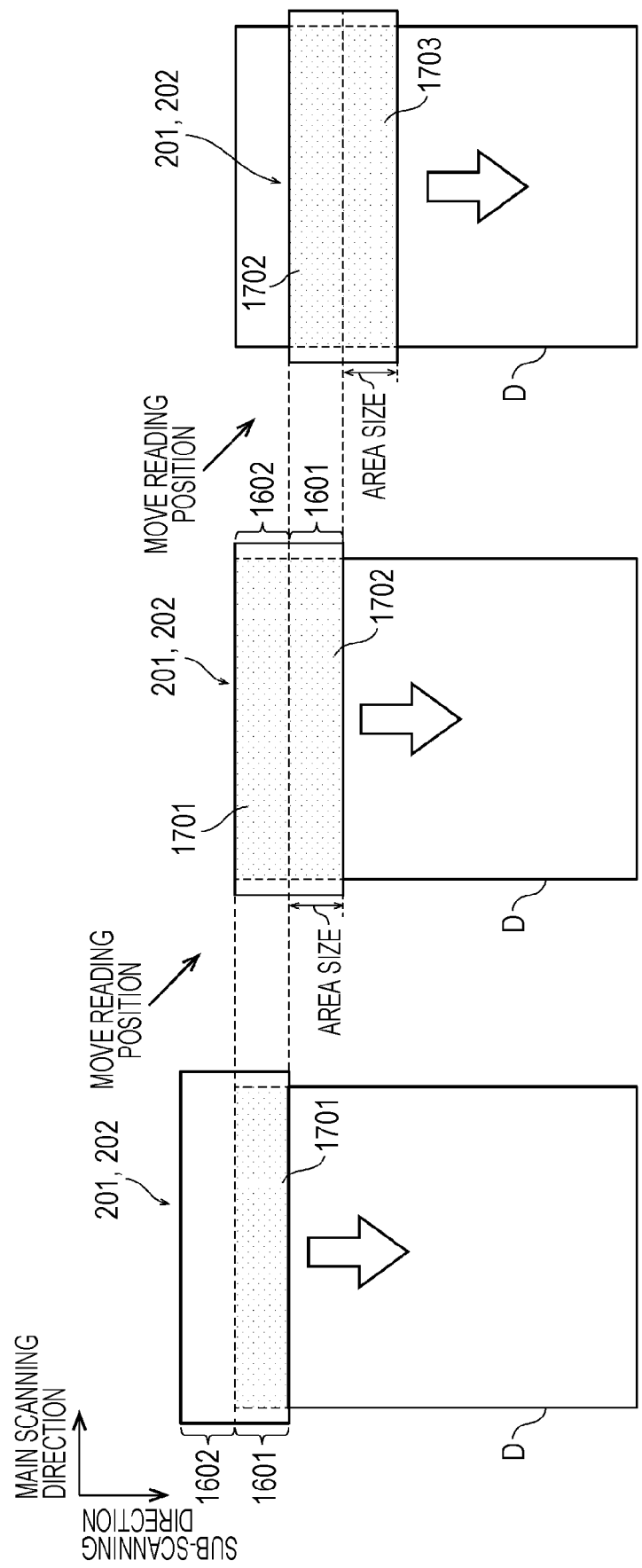
FIG. 17A is a diagram illustrating a first reading position by the first area on the document D.
FIG. 17B is a diagram illustrating a second reading position by the first area and a first reading position by the second area on the document D.
FIG. 17C is a diagram illustrating a third reading position by the first area and the second reading position by the second area on the document D.

In reading the document D, as illustrated in FIG. 16B, first, a reading region 1701 of the document D is read in the first area 1601 (FIG. 17A), then the reading position is moved in the sub-scanning direction by the area size that is the size of the first area 1601 and the second area 1602 in the sub-scanning direction, the region 1701 read in the first area 1601 before the movement is read in the second area 1602, and a region 1702 adjacent to the reading region 1701 in the sub-scanning direction is read in the first area 1601 (FIG. 17B).

Thereafter, the reading position is further moved, and reading of the document D is repeated to read the entire document D (FIG. 17C).

Note that, in the present modification example and also in the above-described embodiment, when the document D is read in the first areas 501 and 1601, the document D may be surely read in the second areas 502 and 1602. Further, when the document D is read in the second areas 502 and 1602, the document D may always be read in the first areas 501 and

1601. Further, when the reading of the document D is started, the end of the document D and the end of the first areas 501 and 1601 in the sub-scanning direction need not coincide with each other.

With this configuration, it is not necessary to adjust the reading position (timing) of the document D by the area sensor according to the position of the document D in the sub-scanning direction, so that the image reading unit 100 can be easily controlled. The range occupied by the document D in the image data read and synthesized may be specified after the image data is synthesized and complemented, and the skew of the document D in the image data may be corrected at that time.

Even in this case, it is possible to obtain image data with high resolution with little distortion in gradation characteristics.

(7-2) In the above modification example, the case where the arrangement of the color filters is made different without separating the first area 1601 and the second area 1602 on the area sensor has been described as an example. However, the present disclosure is obviously not limited to this example, and the following may be adopted instead.

Figure 18A:
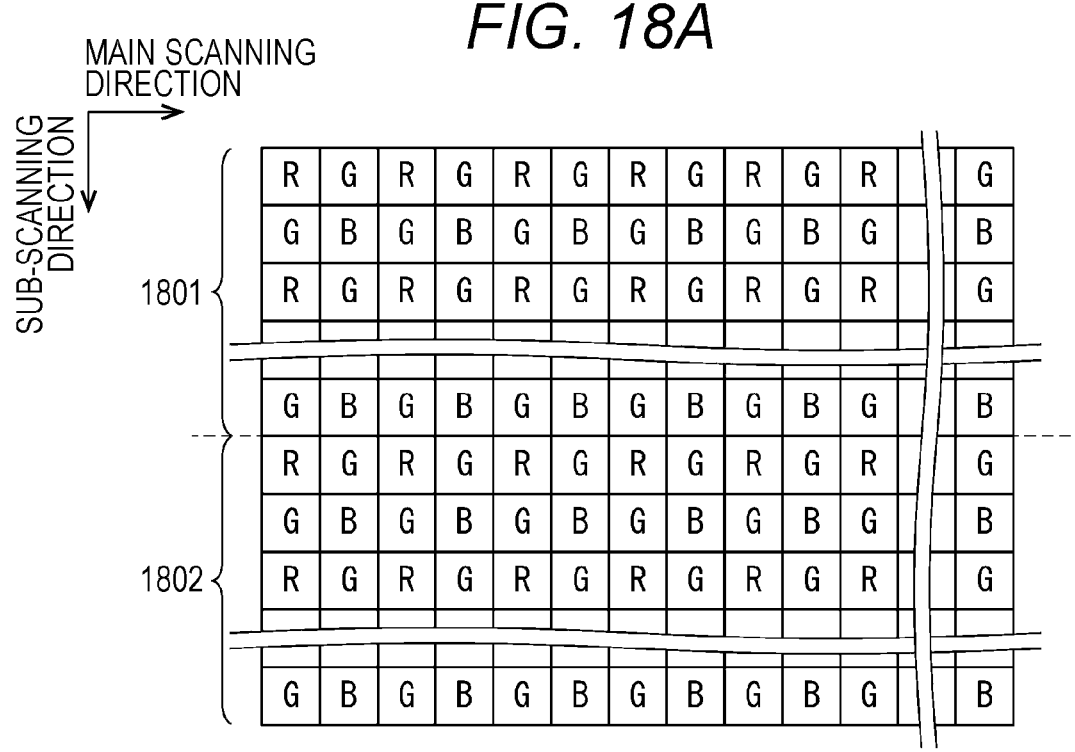
FIG. 18A is a plan view for explaining a filter configuration of a first area and a second area according to a modification example of the present disclosure.

That is, as illustrated in FIG. 18A, a first area 1801 and a second area 1802 are adjacent to and in contact with each other in the sub-scanning direction, and the color filters are arranged in the same manner.

Figure 18B:
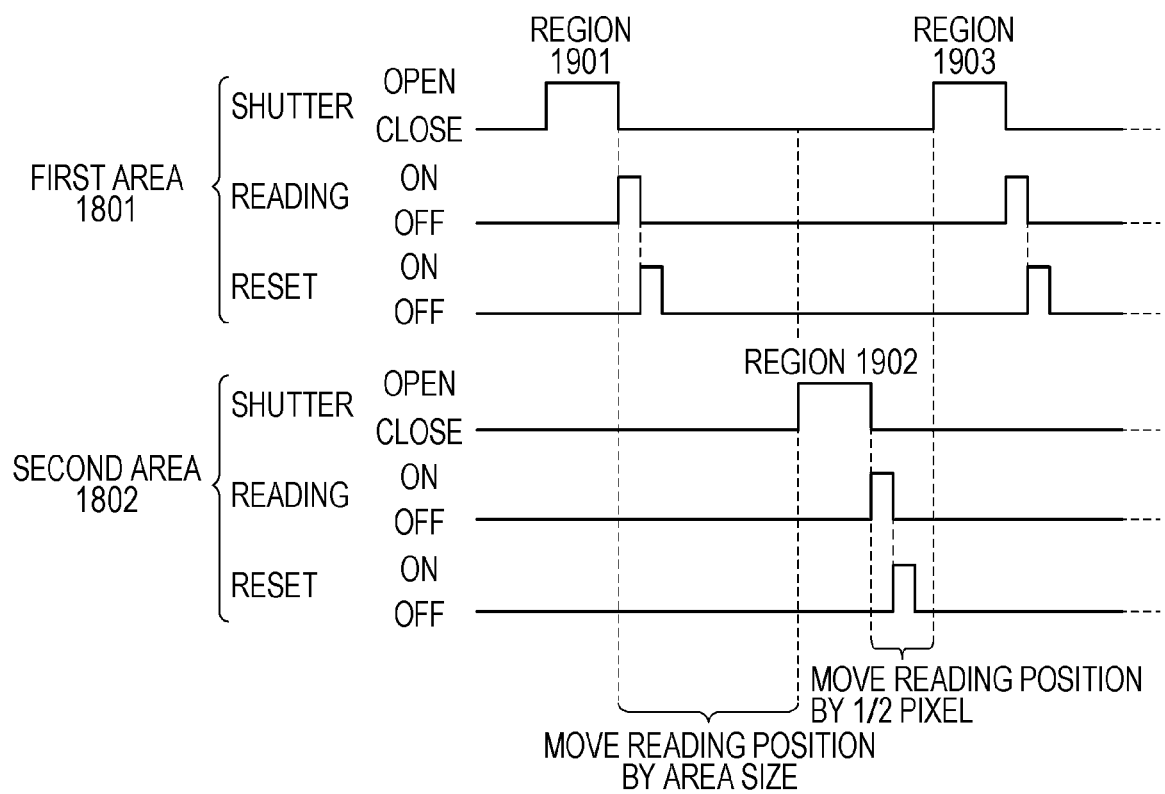
FIG. 18B is a timing chart for explaining reading timings in the first area and the second area.

In reading the document D, as illustrated in FIG. 18B, first, a reading region 1901 (FIG. 19A) of the document D is read in the first area 1801, then the reading position of the document D is moved in the sub-scanning direction by a distance ((area size)−(½ pixels)) shorter by ½ pixels from the area size, and then a reading region 1902 (FIG. 19B) of the document D is read in the second area 1802. Thereafter, the reading position is further moved by ½ pixels in the sub-scanning direction, and a reading region 1903 (FIG. 19C) of the document D is read in the first area 1801.

In this manner, the entire document D is read by repeating the process of reading the document D in the first area 1801, moving the reading position by (area size)−(½ pixels) in the sub-scanning direction, reading the document D in the second area, moving the reading position by ½ pixels in the sub-scanning direction, and reading the document D again in the first area 1801.

Even in this case, it is possible to generate two pieces of image data shifted from each other by ½ pixels, similarly to the above-described embodiment.

In addition to these modification examples, it is also possible to form a single area configuration without dividing the area sensor into the first area and the second area, and perform scanning twice in the sub-scanning direction to generate two pieces of image data shifted by ½ pixels. Regardless of the method and the device configuration for reading image data shifted by ½ pixels from the document D, a similar effect can be obtained by synthesizing and interpolating the image data as in the present disclosure.

(7-3) In the above embodiment, the case where the synthesis, interpolation, and image processing of the image data are executed using the image reading control unit 103 has been described as an example. However, the present disclosure is obviously not limited to this, and instead, the following may be performed.

For example, the main body control unit 114 of the multifunction peripheral 1 may execute image data synthesis, interpolation, and image processing. In this case, only the process in step S1101 in FIG. 11 is executed by the image reading control unit 103, and the processes in steps S1102 and S1103 are executed by the main body control unit 114. In this case, the multifunction peripheral 1 is an image processing device that performs image processing on the image data read by the image reading unit 100.

(7-4) In the above embodiment, the case where the arrangement of the color filters is matched between the pixels belonging to the first area 501 and the arrangement of the color filters is matched between the pixels belonging to the second area 502 has been described as an example. However, it is needless to say that the present disclosure is not limited to this, and the arrangement of the color filters may be different between the pixels belonging to the same area.

Figure 20A:
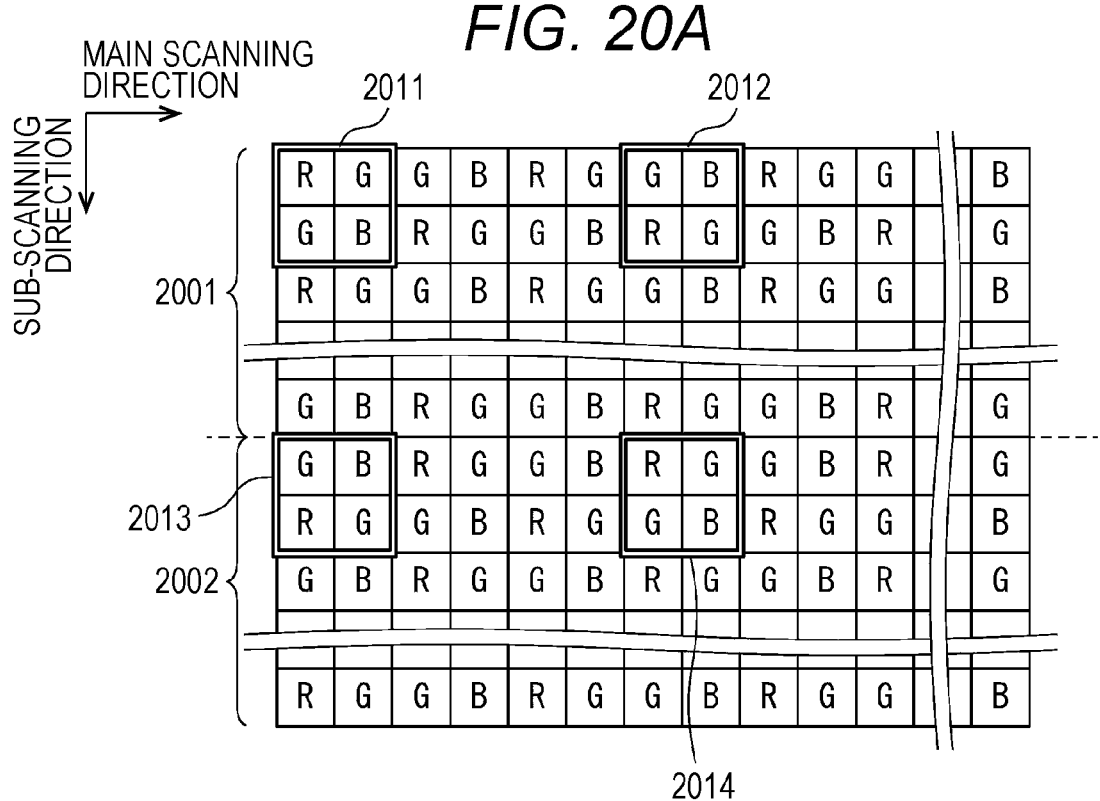
FIG. 20A is a diagram illustrating a case where the arrangement of color filters is different between pixels in the same area of the area sensor.

For example, in the modification example illustrated in FIGS. 16A and 16B, as illustrated in FIG. 20A, the arrangement of the color filters is different between a pixel 2011 and a pixel 2012 in a first area 2001 of the area sensor. Even in such a case, in a second area 2002 of the area sensor, in a pixel 2013 located at the position corresponding to the pixel 2011 in the first area 2001, the R-color filter may be arranged at the position corresponding to one of the two G-color filters of the pixel 2011, the B-color filter may be arranged at the position corresponding to the other of the two G-color filters, and the G-color filter may be arranged at the position corresponding to the R-color filter and B-color filter of the pixel 2011.

Here, the pixel 2011 in the first area 2001 and the pixel 2013 at the position corresponding to the pixel 2011 in the second area read the same position on the document D.

In a pixel 2014 located at the position corresponding to the pixel 2012 in the first area 2001 and the pixel 2012, it is sufficient that while the color filters of R color are located at the same position in the main scanning direction, the color filters of R color are located at different positions in the sub-scanning direction, while the color filters of B color are located at the same position in the main scanning direction, the color filters of B color are located at different positions in the sub-scanning direction, and the two color filters of one G color are located at different positions from the two color filters of the other G color.

Figure 20B:
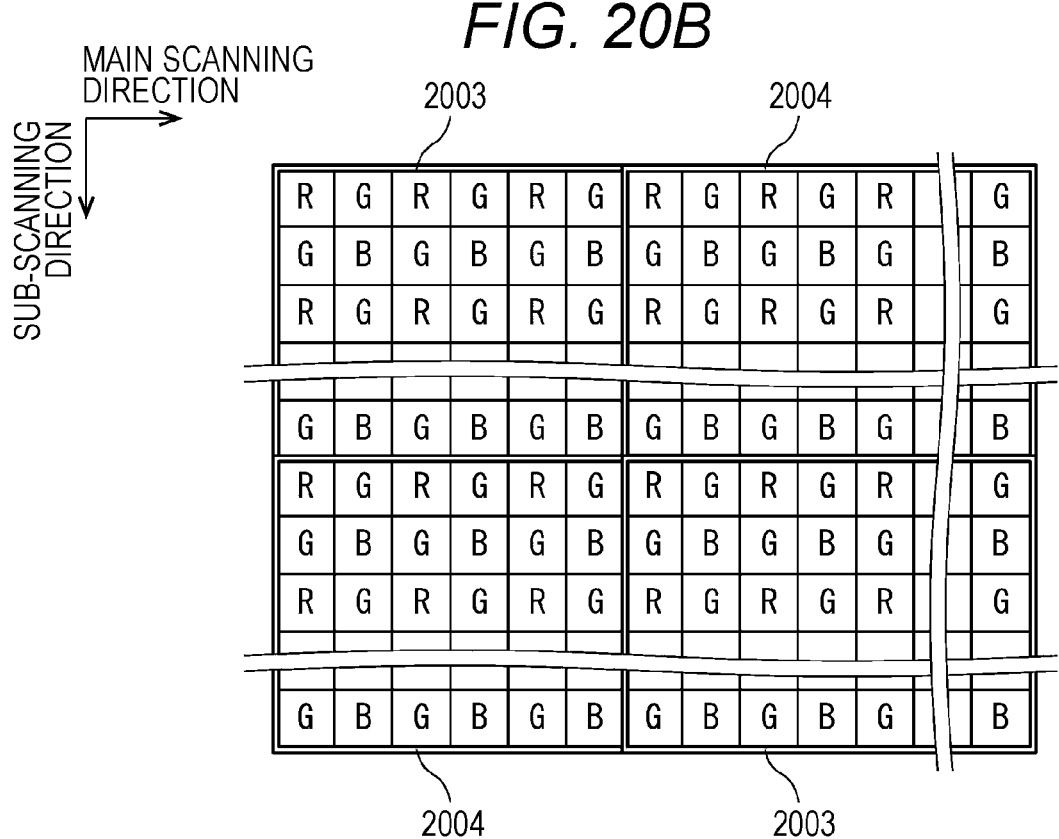
FIG. 20B is a diagram illustrating a case where a first area and a second area are arranged in the main scanning direction.

As illustrated in FIG. 20B, the first area 2003 and the second area 2004 of the area sensor may be adjacent to each other in the main scanning direction. In the example of FIG. 20B, the pixels belonging to the first area 2003 have the same arrangement of color filters, and the pixels belonging to the second area 2004 also have the same arrangement of color filters.

However, as described above, it is sufficient that the arrangement of the color filters is in the above-described relationship between the pixels corresponding to the first area and the second area, and even in the case illustrated in FIG. 20B, the arrangement of the color filters does not have to match between the pixels in the same area.

With this configuration, the image data can be synthesized as illustrated in FIG. 7C for the respective R, G, B colors, and the image data can be interpolated as illustrated in FIG. 8 for the respective R, B colors, so that the color image data with high resolution can be generated from the color image data with low resolution.

(7-5) In the above embodiment, the case where, in the R-color image data after synthesis, the R-color read data is arranged consecutively in the sub-scanning direction every other image in the main scanning direction, and similarly, also in the B-color image data after synthesis, the read data of the B color is arranged consecutively in the sub-scanning direction every other image in the main scanning direction, and the positions of the read data of the R color and the B color consecutive in the sub-scanning direction are different from each other has been described as an example. Needless to say, the present disclosure is not limited to this, and instead, the following may be performed.

Figure 21A:
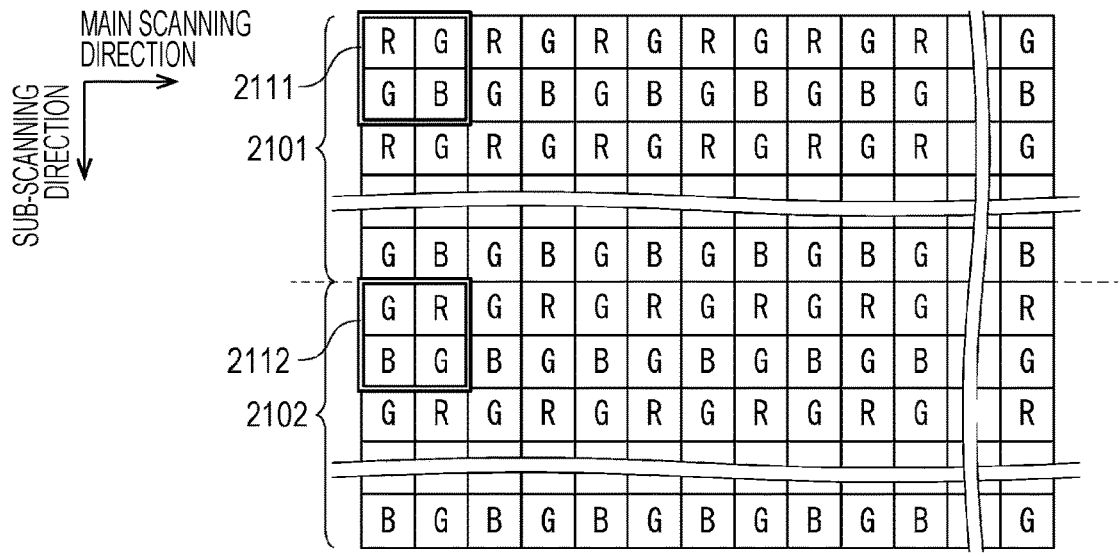
FIG. 21A is a diagram illustrating a case where an arrangement of color filters is different between a first area and a second area.

For example, in FIG. 21A, while the arrangement of the color filters of pixels 2111 and the like in a first area 2101 coincides with the arrangement of the color filters of the pixels 1611 and the like in the first area 1601 in FIG. 16A, the arrangement of the color filters of R color and B color of pixels 2112 and the like in a second area 2102 is opposite to the arrangement of the color filters of the pixels 1612 and the like in the second area 1602 in FIG. 16A.

Figure 21B:
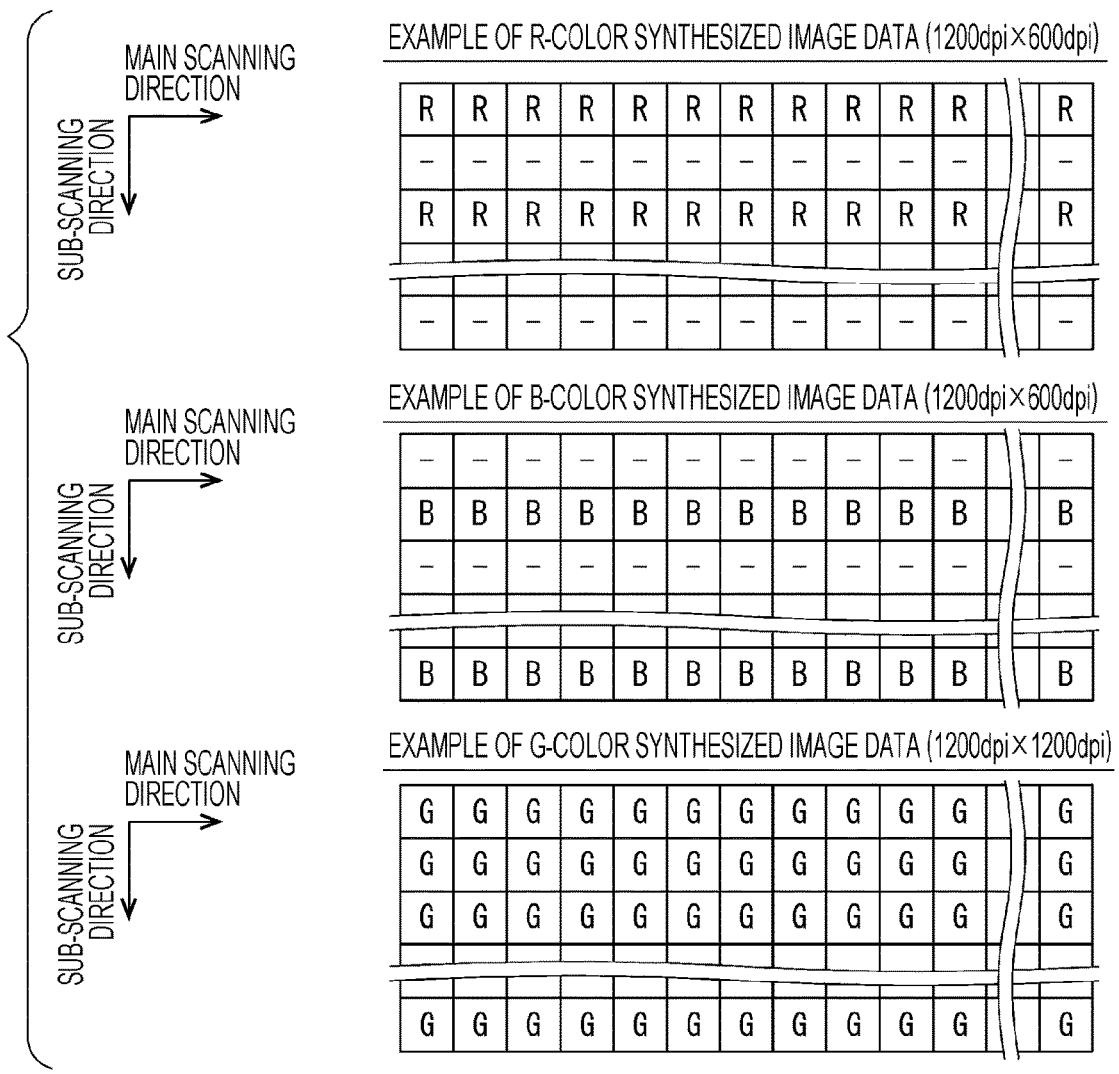
FIG. 21B is a diagram illustrating image data synthesized for each reading color.

When the document is read using such an area sensor, and the read data of the first area 2101 and the read data of the second area 2102 are synthesized, as illustrated in FIG. 21B, for the image data of the R color and the B color, the read data is continuously arranged in the main scanning direction every other image data in the sub-scanning direction. Also in this case, image data of R color and B color can be interpolated to obtain image data with high resolution in the same manner as in the above embodiment.

(7-6) In the above embodiment, the case where the reading regions 601, 603, and 605 by the first area 501 of the area sensors 201 and 202 are adjacent in the sub-scanning direction without overlapping each other, and the reading regions 602 and 604 by the second area 502 are also adjacent in the sub-scanning direction without overlapping each other has been described as an example. However, the present disclosure is obviously not limited thereto, and these reading regions may overlap each other in the sub-scanning direction.

The conveying speed of the document D and the moving speeds of the first mirror unit 230 and the second mirror unit 240 may vary. Due to this variation, when the reading regions are separated from each other, a portion that cannot be read on the document D may occur. On the other hand, if the reading regions of the first area 501 partially overlap each other or the reading regions of the second area 502 partially overlap each other, and the read data is edited such that the overlapping portions are matched when the image data is synthesized from the read data, the effect of the present disclosure can be obtained while omitting the reading leakage of the document D.

(7-7) Although the image reading device and the image processing device according to the present disclosure have been described above, it is needless to say that the present disclosure is not limited thereto, and for example, an image reading method executed by the image reading device or an image processing method executed by the image processing device may be used. In addition, the program may be an image reading program for causing a computer to execute the image reading method or an image processing program for causing a computer to execute the image processing method. In addition, the image reading program and the image processing program according to the present disclosure can be recorded on various computer-readable recording media such as a magnetic tape, a magnetic disk such as a flexible disk, an optical recording medium such as a DVD-ROM, a DVD-RAM, a CD-ROM, a CD-R, an MO, and a PD, and a flash memory-based recording medium. The image reading program and the image processing program may be produced, transferred, or the like in the form of the recording medium, or may be transmitted and supplied via various wired or wireless networks including the Internet, broadcasting, electric communication lines, satellite communication, or the like in the form of a program.

(7-8) In the above embodiment, the multifunction peripheral has been described as an example, but the present disclosure is obviously not limited to the example, and a similar effect can be obtained by applying the present disclosure to a scanner device, a copy device having a printing function added thereto, and a facsimile device having a facsimile communication function added thereto.

The image reading device, the image reading program, the image processing device, and the image processing program according to the present disclosure are useful as techniques for increasing resolution of image data to prevent distortion of halftone gradations represented by halftone dots.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image reading device comprising:
   an area sensor in which color filters of three colors of R, G, and B are arranged in a Bayer array and a light receiving amount is detected by a light receiving element for each color filter; and
   a hardware processor that:
   reads a document by using the light receiving elements in a first group in the area sensor,
   reads the document by using the light receiving elements in a second group in the area sensor, at a region shifted by ½ pixels in a sub-scanning direction from a reading region of the light receiving elements in the first group, and
   interpolates R-color read data and B-color read data using G-color read data and synthesizes image data having a resolution twice the resolution of the area sensor.

2. The image reading device according to claim 1, wherein
   when the reading positions on the document read by the four light receiving elements arranged in a square array among the light receiving elements in the first group and the reading positions on the document read by the four light receiving elements arranged in the square array among the light receiving elements in the second group are the same,
   the arrangement of the color filters corresponding to the four light receiving elements in the first group and the arrangement of the color filters corresponding to the four light receiving elements in the second group are as follows:
   in the square array of the second group,
   an R-color filter is arranged at a position corresponding to one of two G-color filters in the square array in the first group, and
   a B-color filter is arranged at a position corresponding to the other of the two G-color filters, and
   G-color filters are arranged at a position corresponding to an R-color filter and a B-color filter in the square array in the first group.

3. The image reading device according to claim 1, wherein
   when interpolating the R-color read data and the B-color read data, the G-color read data on periphery of the R-color read data and the B-color read data is used.

4. The image reading device according to claim 3, wherein
   when a difference between the peripheral G-color read data is equal to or less than a predetermined threshold value, the interpolation is performed using the peripheral R-color read data or B-color read data instead of the peripheral G-color read data.

5. The image reading device according to claim 1, wherein
the hardware processor further
performs region determination using the G-color read data, and
performs image processing according to the determination result.

6. The image reading device according to claim 5, wherein
when a difference between pieces of the G-color read data used for the region determination is equal to or less than a predetermined threshold value, the hardware processor performs the region determination using the R-color read data or the B-color read data instead of the G-color read data.

7. The image reading device according to claim 5, wherein
the hardware processor determines whether or not the region belongs to at least one of halftone dots, text, photographs, edges, and thin lines.

8. The image reading device according to claim 5, wherein
the hardware processor performs image processing including at least one of a smoothing process, edge enhancement process, and a thin line process.

9. An image reading device comprising:
an area sensor in which color filters of three colors of R, G, and B are arranged in a Bayer array and a light receiving amount is detected by a light receiving element for each color filter; and
a hardware processor that:
reads a document by using the light receiving elements of a first group in the area sensor for each reading region of the document,
reads the document by using the light receiving elements of a second group in the area sensor for each reading region, and
interpolates R-color read data and B-color read data using G-color read data and synthesizes image data having a resolution twice the resolution of the area sensor,
wherein, in the first group, the arrangement of the color filters in each pixel is shifted from the arrangement in the second group by ½ pixels in a sub-scanning direction.

10. A non-transitory recording medium storing a computer readable image reading program causing a computer to perform:
detecting a light receiving amount by using a light receiving element for each color filter, the color filters of three colors of R, G, and B being arranged in a Bayer array;
reading a document by using the light receiving elements in a first group in an area sensor;
reading the document by using the light receiving elements in a second group in the area sensor, at a region shifted by ½ pixels in a sub-scanning direction from a reading region of the light receiving elements in the first group; and
interpolating R-color read data and B-color read data using G-color read data and synthesizing image data having a resolution twice the resolution of the area sensor.

11. A non-transitory recording medium storing a computer readable image reading program causing a computer to perform:
detecting a light receiving amount by using a light receiving element for each color filter, the color filters of three colors of R, G, and B being arranged in a Bayer array;
reading a document by using the light receiving elements in a first group in an area sensor for each reading region of the document;
reading the document by using the light receiving elements in a second group in the area sensor for each reading region; and
interpolating R-color read data and B-color read data using G-color read data and synthesizing image data having a resolution twice the resolution of the area sensor,
wherein, in the first group, the arrangement of the color filters for each pixel is shifted from the arrangement in the second group by ½ pixels in a sub-scanning direction.

12. An image processing device comprising
a hardware processor that:
acquires first read data obtained by reading a document by using a light receiving element in a first group in an area sensor, in which color filters of three colors of R, G, and B are arranged in a Bayer array and a light receiving amount is detected by the light receiving element for each color filter, and second read data obtained by reading the document by using the light receiving element in a second group in the area sensors, at a region shifted by ½ pixels in a sub-scanning direction from the reading region of the light receiving element of the first group, and
interpolates R-color read data and B-color read data using G-color read data and synthesizes image data having a resolution twice the resolution of the area sensor.

13. An image processing device comprising:
a hardware processor that:
acquires first read data obtained by reading a document for each reading region by using a light receiving element in a first group in an area sensor, in which color filters of three colors of R, G, and B are arranged in a Bayer array and a light receiving amount is detected by the light receiving element for each color filter, and second read data obtained by reading the document for each reading region by using the light receiving element in a second group in the area sensors, and
interpolates R-color read data and B-color read data by using G-color read data and synthesizes image data having a resolution twice the resolution of the area sensor,
wherein, in the first group, the arrangement of the color filters for each pixel is shifted from the arrangement of the second group by ½ pixels in a sub-scanning direction.

14. A non-transitory recording medium storing a computer readable image processing program causing a computer to perform:
acquiring first read data obtained by reading a document by using a light receiving element in a first group in an area sensor, in which color filters of three colors of R, G, and B are arranged in a Bayer array and a light receiving amount is detected by the light receiving element for each color filter, and second read data obtained by reading the document by using the light receiving element of a second group of the area sensors, at a region shifted by ½ pixels in a sub-scanning direction from the reading region on the light receiving element in the first group; and interpolating R-color read data and B-color read data by using G-color read data and synthesizing image data having a resolution twice the resolution of the area sensor.

15. A non-transitory recording medium storing a computer readable image processing program causing a computer to perform:
acquiring first read data obtained by reading a document for each reading region by using a light receiving element in a first group in an area sensor, in which color filters of three colors of R, G, and B are arranged in a Bayer array and a light receiving amount is detected by the light receiving element for each color filter, and second read data obtained by reading the document by using the light receiving element in a second group in the area sensor for each reading region; and
interpolating R-color read data and B-color read data by using G-color read data and synthesizing image data having a resolution twice the resolution of the area sensor,
wherein, in the first group, the arrangement of the color filters for each pixel is shifted from the arrangement in the second group by ½ pixels in a sub-scanning direction.

* * * * *